US008788746B2

(12) United States Patent
Matsushima et al.

(10) Patent No.: US 8,788,746 B2
(45) Date of Patent: Jul. 22, 2014

(54) INFORMATION PROCESSING APPARATUS, IMAGE FORMING APPARATUS, DATA RECOVERY METHOD, AND COMPUTER-READABLE RECORDING MEDIUM

(75) Inventors: Hiroyuki Matsushima, Kanagawa (JP); Ryouji Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 822 days.

(21) Appl. No.: 12/659,610

(22) Filed: Mar. 15, 2010

(65) Prior Publication Data

US 2010/0238507 A1    Sep. 23, 2010

(30) Foreign Application Priority Data

Mar. 18, 2009 (JP) .................................. 2009-066456

(51) Int. Cl.
*G06F 12/00* (2006.01)
*G06F 7/00* (2006.01)

(52) U.S. Cl.
USPC ............ 711/105; 711/103; 711/165; 707/639

(58) Field of Classification Search
USPC .......................... 711/103, 105, 165; 707/639
See application file for complete search history.

(56) References Cited

U.S. PATENT DOCUMENTS

| 7,042,593 | B2 | 5/2006 | Matsushima |
| 7,117,493 | B2 | 10/2006 | Matsushima |
| 7,698,503 | B2 * | 4/2010 | Okada et al. ................... 711/115 |
| 2004/0168034 | A1 * | 8/2004 | Homma et al. ................ 711/162 |
| 2004/0199757 | A1 * | 10/2004 | Hashimoto et al. .............. 713/1 |
| 2007/0061533 | A1 * | 3/2007 | Burton et al. .................. 711/162 |
| 2007/0101077 | A1 * | 5/2007 | Evanchik et al. .............. 711/162 |

FOREIGN PATENT DOCUMENTS

| JP | 2000-172574 | 6/2000 |
| JP | 2002-324012 | 11/2002 |
| JP | 2006-015608 | 1/2006 |
| JP | 2006-127287 | 5/2006 |
| JP | 2006127287 | * 5/2006 |

OTHER PUBLICATIONS

Office Action issued in Japanese Patent Application No. JP 2009-066456 on Mar. 19, 2013.

* cited by examiner

*Primary Examiner* — Reginald Bragdon
*Assistant Examiner* — Mehdi Namazi
(74) *Attorney, Agent, or Firm* — Harness, Dickey & Pierce, P.L.C.

(57) ABSTRACT

An information processing apparatus includes a volatile main storage; a nonvolatile first-auxiliary storage; a nonvolatile second-auxiliary storage for storing second data; a processing unit for loading the second data from the second-auxiliary storage into the main storage; a storing unit for storing first data stored in the main storage into the first-auxiliary storage at a predetermined timing, wherein the first data includes the second data that was loaded into the main storage from the second-auxiliary storage; and a loading unit for loading the first data stored in the first-auxiliary storage into the main storage. After the loading unit loads the first data into the main storage, the processing unit loads, from the second-auxiliary storage into the main storage, the second data that was changed after the storing unit stored the first data into the first-auxiliary storage from the main storage section.

9 Claims, 20 Drawing Sheets

FIG.10

| COMPONENT ID | DATA ID | STORAGE LOCATION | SIZE |
|---|---|---|---|
| USER INFORMATION | INDEX | DATABASE (HDD) | 128KB |
| ENGINE | ENGINE PARAMETER | NVRAM | 512B |

INFORMATION PROCESSING APPARATUS, IMAGE FORMING APPARATUS, DATA RECOVERY METHOD, AND COMPUTER-READABLE RECORDING MEDIUM

BACKGROUND OF THE INVENTION

1. Field of the Invention

The present invention relates to an information processing apparatus for storing data included in a volatile memory into a nonvolatile memory, and then loading the data in the volatile memory when a device is activated, and more particularly to an information processing apparatus, an image forming apparatus, a data recovery method, and a computer-readable recording medium with which the number of times of storing data in the nonvolatile memory can be reduced.

2. Description of the Related Art

When a device equipped with an information processing apparatus includes many functions that can be used by users, in many cases, it takes a long time from when the power is turned on until activation of the device is completed. The same applies to a digital multifunction peripheral having a copy function. The more the functions, such as a copy function, a printer function, and a fax function, the longer it takes for the device to be activated.

For the purpose of reducing the activation time, hibernation is performed in digital multifunction peripherals. Specifically, information of a work environment (hereinafter, "snapshot") is stored in a nonvolatile memory before the power is turned off, and when the power is turned on once again, the snapshot is recovered in (returned to) the main memory, so that the activation time can be reduced (see, for example, patent document 1: Japanese Laid-Open Patent Application No. 2002-324012). Patent document 1 discloses a digital multifunction peripheral having the following features. Specifically, when activating the digital multifunction peripheral, the user is prompted by the OS (operating system) to indicate which hibernation area is to be used for the activation. If the specified hibernation area stores a snapshot that had been stored according to hibernation interrupt when the OS was previously shut down, the snapshot stored in the specified hibernation area is used to perform a recovery process. The digital multifunction peripheral described in patent document 1 has a function of selectively storing either of the following data items. One of the types of data is for indicating the operation status of the system. This data is stored in the hibernation area corresponding to the current user in response to hibernation interrupt. The other type of data is hibernation data including modification data indicating modifications (changes) in the data in the storage device according to operations performed by the user.

A digital multifunction peripheral is typically provided with a main power switch and an auxiliary power switch. The auxiliary power switch is for switching the device to a power saving status. When the auxiliary power switch is pressed, the entire system of the digital multifunction peripheral is switched to a power saving status in terms of the software, while power is being supplied from the main power source. In the power saving status, the user can safely turn off the power by pressing the main power switch. Thus, if hibernation were to be performed, a snapshot is to be stored at the timing when the device switches to the power saving status.

For the purpose of reducing power consumption, a digital multifunction peripheral typically has a function of automatically switching to a power saving status when the digital multifunction peripheral is not used by any users for a predetermined period of time, even if the auxiliary power switch is not pressed. From the user's point of view, when the digital multifunction peripheral has automatically switched to the power saving status, the user can safely turn off the main power switch. Thus, if hibernation were to be performed, a snapshot is to be stored at the timing when the device automatically switches to the power saving status.

The storage device used for storing snapshots may be a HDD (Hard Disk Drive) or a flash-memory-based storing medium (e.g., an SD card and a SSD (Solid State Drive), hereinafter collectively referred to as a "flash memory"). However, a HDD takes a long time to spin up, and is thus disadvantageous in terms of reducing the activation time. Furthermore, a HDD is prone to crashing, and is thus disadvantageous in terms of reliability for storing important data pertaining to the activation of the system.

Meanwhile, a flash memory is advantageous because it can be quickly initialized, and it is less prone to crashing. However, a flash memory has disadvantages in that the access speed is slow and there is a limit to the number of times it can be overwritten. A digital multifunction peripheral automatically switches to a power saving status when a certain period of time set in a timer has elapsed since a user last used the device. The user can set a time period of approximately one minute at minimum in the timer. Therefore, depending on how the digital multifunction peripheral is used, a snapshot may be stored several ten to several hundred times per day. Thus, if a flash memory is used as the storage device for storing snapshots, the following disadvantages may arise. One disadvantage is that the operation time of the digital multifunction peripheral is limited by the upper limit of the number of times the flash memory can be overwritten. Another disadvantage is that there may be inconveniences in terms of maintenance because of the need to replace components.

SUMMARY OF THE INVENTION

The present invention provides an information processing apparatus, an image forming apparatus, a data recovery method, and a computer-readable recording medium, in which one or more of the above-described disadvantages are eliminated.

A preferred embodiment of the present invention provides an information processing apparatus, an image forming apparatus, a data recovery method, and a computer-readable recording medium, which have less impact on the durability of the storage device used for storing snapshots.

According to an aspect of the present invention, there is provided an information processing apparatus including a main storage section that is volatile; a first auxiliary storage section that is nonvolatile; a second auxiliary storage section that is nonvolatile and configured to store second data; a data processing unit configured to load the second data from the second auxiliary storage section into the main storage section; a storing unit configured to store first data that is stored in the main storage section into the first auxiliary storage section at a predetermined timing, wherein the first data includes the second data that has been loaded into the main storage section from the second auxiliary storage section; and a loading unit configured to load the first data stored in the first auxiliary storage section into the main storage section, wherein after the loading unit has loaded the first data into the main storage section from the first auxiliary storage section, the data processing unit loads, from the second auxiliary storage section into the main storage section, the second data that has changed after the storing unit has stored the first data into the first auxiliary storage section from the main storage section.

According to an aspect of the present invention, there is provided a data recovery method including storing second data in a second auxiliary storage section that is nonvolatile; loading the second data from the second auxiliary storage section into a main storage section that is volatile; storing first data that is stored in the main storage section into a first auxiliary storage section that is nonvolatile at a predetermined timing, wherein the first data includes the second data that has been loaded into the main storage section from the second auxiliary storage section; and loading the first data stored in the first auxiliary storage section into the main storage section, wherein after loading the first data into the main storage section from the first auxiliary storage section, the second data, which has been changed after the first data is stored into the first auxiliary storage section from the main storage section, is loaded into the main storage section from the second auxiliary storage section.

According to an aspect of the present invention, there is provided a computer-readable recording medium recording a program that causes an information processing apparatus to execute a method including storing second data in a second auxiliary storage section that is nonvolatile; loading the second data from the second auxiliary storage section into a main storage section that is volatile; storing first data that is stored in the main storage section into a first auxiliary storage section that is nonvolatile at a predetermined timing, wherein the first data includes the second data that has been loaded into the main storage section from the second auxiliary storage section; and loading the first data stored in the first auxiliary storage section into the main storage section, wherein after loading the first data into the main storage section from the first auxiliary storage section, the second data, which has been changed after the first data is stored into the first auxiliary storage section from the main storage section, is loaded into the main storage section from the second auxiliary storage section.

According to one embodiment of the present invention, an information processing apparatus, an image forming apparatus, a data recovery method, and a computer-readable recording medium are provided, which have less impact on the durability of the storage device used for storing snapshots.

BRIEF DESCRIPTION OF THE DRAWINGS

Other objects, features and advantages of the present invention will become more apparent from the following detailed description when read in conjunction with the accompanying drawings, in which:

FIG. 10 illustrates an example of a data change management table which is referred to by a change management unit;

DETAILED DESCRIPTION OF THE PREFERRED EMBODIMENTS

A description is given, with reference to the accompanying drawings, of embodiments of the present invention.

[First Embodiment]

A digital multifunction peripheral (MFP) 100 according to a first embodiment of the present invention stores information (hereinafter, "snapshot") of a work environment in a nonvolatile memory by implementing hibernation. The digital MFP 100 performs this operation of storing a snapshot only when a significant modification (change) is made in the software configuration or the hardware configuration. Accordingly, the frequency of storing snapshots can be reduced. Therefore, with the digital MFP 100, the operation of storing snapshots has less impact on the durability of the flash memory (because fewer snapshots are written in). Examples of significant modifications (changes) made in the software configuration or the hardware configuration are adding/deleting/updating applications, updating the data used by applications, attaching/removing of hardware, etc.

Figure 1:
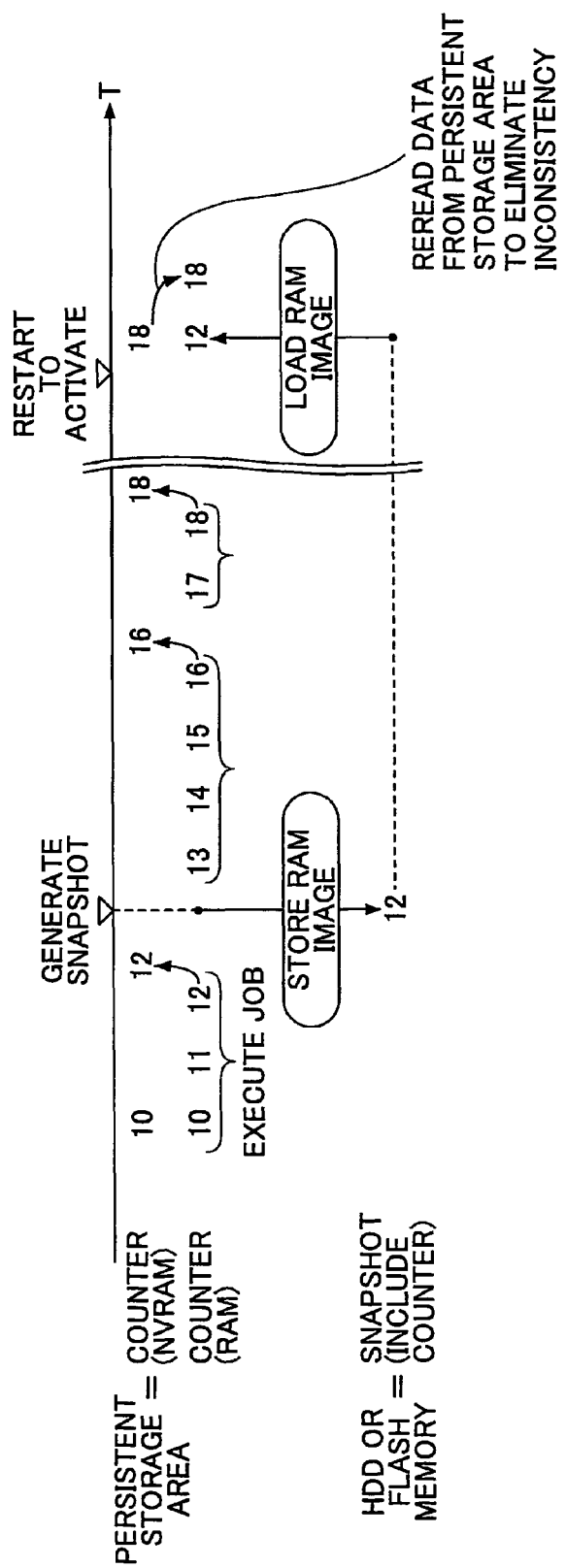
FIG. 1 is for describing the inconvenience of hibernation.

However, the above configuration of generating snapshots may cause the following inconvenience. FIG. 1 is for describing the inconvenience of hibernation. When the digital MFP 100 is configured to store snapshots, every time the digital MFP 100 is activated, contents of the previously stored snapshot are loaded in the RAM. However, the data stored in the persistent storage area (in FIG. 1, the NVRAM) may change in the meantime. In such a case, the loaded snapshot and the data in the NVRAM may be inconsistent.

In the example of FIG. 1, a value 12 indicated by a counter (in a RAM) for counting the number of printed sheets is stored in the NVRAM. The value 12 indicated by the counter (RAM) is also stored as a snapshot in a HDD (Hard Disk Drive) or a flash memory. Subsequently, a job corresponding to counter values 13 to 16 and a job corresponding to counter values 17 are 18 are executed. Then, the main power source is turned off when the NVRAM is storing 18.

Subsequently, when the main power source is turned on once again, the snapshot stored when the counter was indicating 12 is loaded in the counter (RAM). Thus, the value indicated by the counter (RAM) returns to 12, while the value stored in the NVRAM is 18. Therefore, the value 12 indicated by the counter (RAM) and the value 18 stored in the NVRAM are inconsistent. Such an inconsistency occurs when the device has the following configuration for the purpose of improving job execution properties. Specifically, data such as counter values and history data stored in the NVRAM is stored into the RAM. Subsequently, while a job is being executed, only the data in the RAM is updated. Once the job is completed, the updated data in the RAM is stored into the NVRAM. With such a configuration, the above-described inconsistency is caused.

If the device continues operating with such inconsistent values (i.e., 12 is stored in the RAM while 18 is stored in the NVRAM), when another job is completed, the value of the NVRAM will be overwritten by old data (e.g., 12→13). Thus, counter values cannot be accurately stored.

To address this problem, in the digital MFP 100 according to the first embodiment of the present invention, when a snapshot is loaded, the counter value of the NVRAM is loaded in the RAM. Accordingly, the inconsistency can be eliminated. Specifically, the digital MFP 100 monitors whether a snapshot is generated, and only when the data (the counter value) changes after a snapshot is generated, the data in the NVRAM is overwritten into the RAM, so that the inconsistency is eliminated. When the digital MFP 100 is activated, only when the data has changed after a snapshot is generated, the corresponding data is loaded into the RAM from the NVRAM. Accordingly, the total activation time may be longer than the time taken for just loading a snapshot; however, the activation time can be prevented from increasing. More details are given below.

<Persistent Storage Area>

A description is given of the persistent storage area. The persistent storage area is a nonvolatile memory where data is written in by an application or a control service described below. Thus, the persistent storage area may be any one of an NVRAM, a HDD, or a flash memory. A persistent storage area is specified for each application and each control service. Snapshots are also stored in a nonvolatile memory. Therefore, there may be cases where the persistent storage area and the nonvolatile memory used for storing snapshots partially overlap each other.

<Hibernation>

Next, a description is given of technologies similar to hibernation. Examples of technologies similar to hibernation are a standby function, a suspend function, and a resume function. The main difference between hibernation and these other technologies is the following. That is, with hibernation, snapshots are stored in a HDD or a flash memory, and therefore the digital MFP 100 does not consume power for storing snapshots. Meanwhile, in the case of a standby function or a suspend function, the digital MFP 100 consumes power for periodically refreshing the RAM which is the main storage unit, for storing snapshots.

Hibernation Function

A hibernation function is a type of a power saving function, which is for saving power by temporarily suspending an operation. The power is turned off after storing a snapshot in a HDD or a flash memory, and therefore power is not consumed for this function.

Standby Function

A standby function is a type of a power saving function. When there are no key inputs or when a TrackPoint (or mouse) is not operated for a predetermined length of time, the HDD or the flash memory switches to a power saving status. The power 10, is not turned off.

Suspend Function

When the device switches to a power saving mode, the operation contents are stored in a system memory (nonvolatile memory), and the device consumes a minimum amount of power required for storing the data. The power is not turned off.

Resume Function

In a broad sense, a resume function may be referred to as a hibernation function, a standby function, or a suspend function; however, the resume function often specifically includes an operation of "recovering a snapshot from a saved state to a regular state".

The snapshot is information stored in a main storage unit (RAM) that is used as a work area for a CPU 11 to execute an OS (Operating System), an application program, or a device driver. The snapshot may include contents of the registers of the CPU 11 or an ASIC (Application Specific Integrated Circuit). As described above, the standby function and the suspend function are different in terms of whether power is supplied and the hardware to which power is supplied. Thus, the same snapshot may not be created in the hibernation function, the standby function, the suspend function, and the resume function. The snapshot is appropriately created according to the system configuration of the digital MFP 100. That is to say, in the present embodiment, contents of the snapshot are not limited.

The HDD and the flash memory have advantages and disadvantages. The HDD requires a long spinup time, but data can be overwritten in the HDD many times. The flash memory requires a short initialization time, but data cannot be overwritten in the flash memory many times. In the method of storing/recovering a snapshot according to an embodiment of the present invention, a HDD or a flash memory may be used as the storage device for storing snapshots; however, it is of note that when a flash memory is used in an embodiment of the present invention, the disadvantage of the flash memory can be eliminated. Furthermore, instead of using a flash memory, an MRAM (Magnetoresistive Random Access Memory or a FeRAM (ferroelectric memory) may be used as the storage device for snapshots.

<Configuration of Digital MFP 100>

Figure 2:
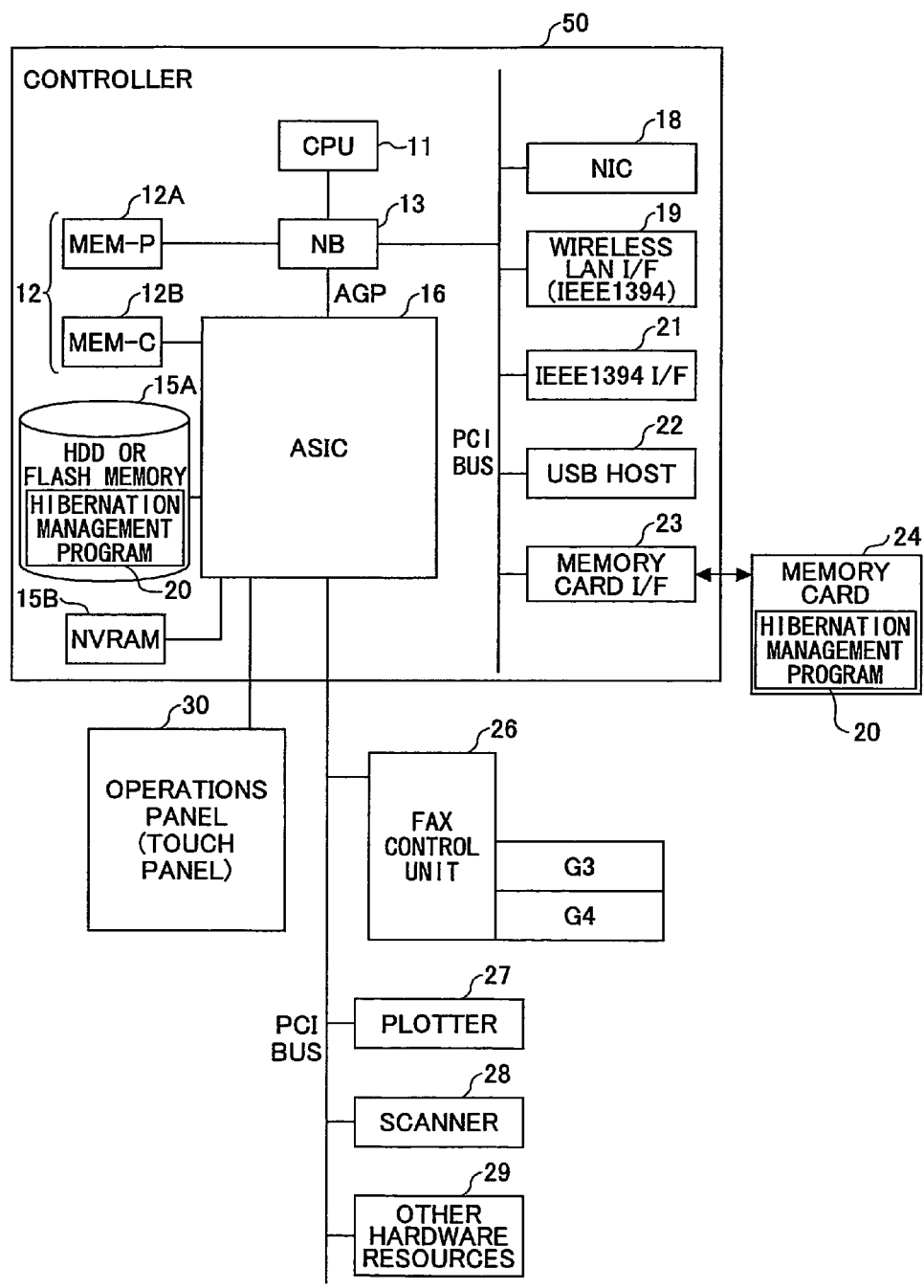
FIG. 2 illustrates a hardware configuration of a digital multifunction peripheral (MFP)

FIG. 2 illustrates a hardware configuration of the digital MFP 100. The digital MFP 100 has a known hardware configuration, and is therefore briefly described. The digital MFP 100 may be provided with at least one of the functions among a printer function, a fax function, a scanner function, and a copier function; the digital MFP 100 need not have two or more functions.

The digital MFP 100 includes a controller 50, a fax control unit 26, a plotter 27, a scanner 28, and other hardware resources 29 that are interconnected by a serial interbus (e.g., a PCI bus or PCI-Express). An operations panel 30 that is operated by a user is connected to the controller 50.

The controller 50 is a control unit for controlling the entire digital MFP 100, and uses the fax control unit 26, the plotter 27, the scanner 28, and the other hardware resources 29 to execute the processes of scanning original documents, printing documents, performing fax transmission/reception, and receiving inputs from the operations panel 30.

The plotter 27 is a monochrome plotter and/or a single drum type color plotter that forms an image for each page based on print data or image data obtained by a scanning process of the scanner 28, and transfers the formed image onto a sheet. For example, an electrophotographic process using laser beams is performed by transferring a toner image formed on a photoconductive drum onto a sheet, fixing the image onto the sheet with heat and pressure in a fixing device, and outputting the sheet.

The scanner 28 generates image data by optically scanning an original placed on the exposure glass, and performing A/D conversion on the reflection light from the original by performing a known imaging process, to generate digital data having a predetermined resolution.

The fax control unit 26 is connected to a public communication network via an NCU (Network Control Unit), and performs fax transmission/reception in accordance with a communication procedure (communication protocol) corresponding to a fax machine of a G3 or G4 specification. The fax control unit 26 performs a signal process on the image data such as data compression or modulation and transmits the image data. The fax control unit 26 also performs data decompression and error correction on image data received from the sender for the purpose of restoring the image data.

The controller 50 includes the CPU 11, a NB (North Bridge) 13, MEM-P 12A, MEM-C 12B, ASIC 16, a HDD or a flash memory 15A, and a NVRAM 15B. The controller 50 further includes a NIC (Network Interface Card) 18 serving as an interface between external devices, a wireless LAN I/F 19, an IEEE 1394 I/F 21, a USB host 22, and a memory card I/F 23.

The CPU 11 controls the entire digital MFP 100 via the NB 13 that controls the transmission of data that passes through a bus connecting the MEM-P 12A, the ASIC 16, and the USB host 22. The CPU 11 executes a hibernation management program 20 stored in the HDD or flash memory 15A to implement the functions described below.

The NB 13 is a bridge IC for connecting the CPU 11 to the MEM-P 12A and an AGP. The MEM-P 12A is a system memory that is used as a rendering memory of the digital MFP 100.

The MEM-C 12B is a local memory used as an image buffer for copying, and also used as a code buffer. The ASIC 16 includes multiple registers and logic circuits, and functions as a control unit of the motor drivers and also as a head pulse generating unit. The ASIC 16 also serves as a bridge for connecting the AGP, the HDD or flash memory 15A, and the MEM-C 12B.

The MEM-P 12A and the MEM-C 12B correspond to the main storage unit (RAM). Hereinafter, the MEM-P 12A and the MEM-C 12B may be collectively referred to as a RAM 12.

The operations panel 30 is an operations unit for receiving input operations from a user and displaying information to the user. The operations panel 30 includes an input unit including a keyboard and a touch panel, and also serves as a display unit such as an LCD (liquid-crystal display).

The HDD or flash memory 15A is a storage unit for storing image data, various programs such as an OS 44, at least one application 41, and font data. In the present embodiment, the HDD or flash memory 15A stores the hibernation management program 20 and snapshots. The hibernation management program 20 may be stored in a memory card 24, distributed via the memory card 24, and installed in the HDD or flash memory 15A. Alternatively, the hibernation management program 20 may be downloaded from a server and installed in the HDD or flash memory 15A. The memory card 24 may be, for example, a USB memory, an SD card, a multimedia card, or an xD card.

<Functional Blocks of Digital MFP 100>

Figure 3:
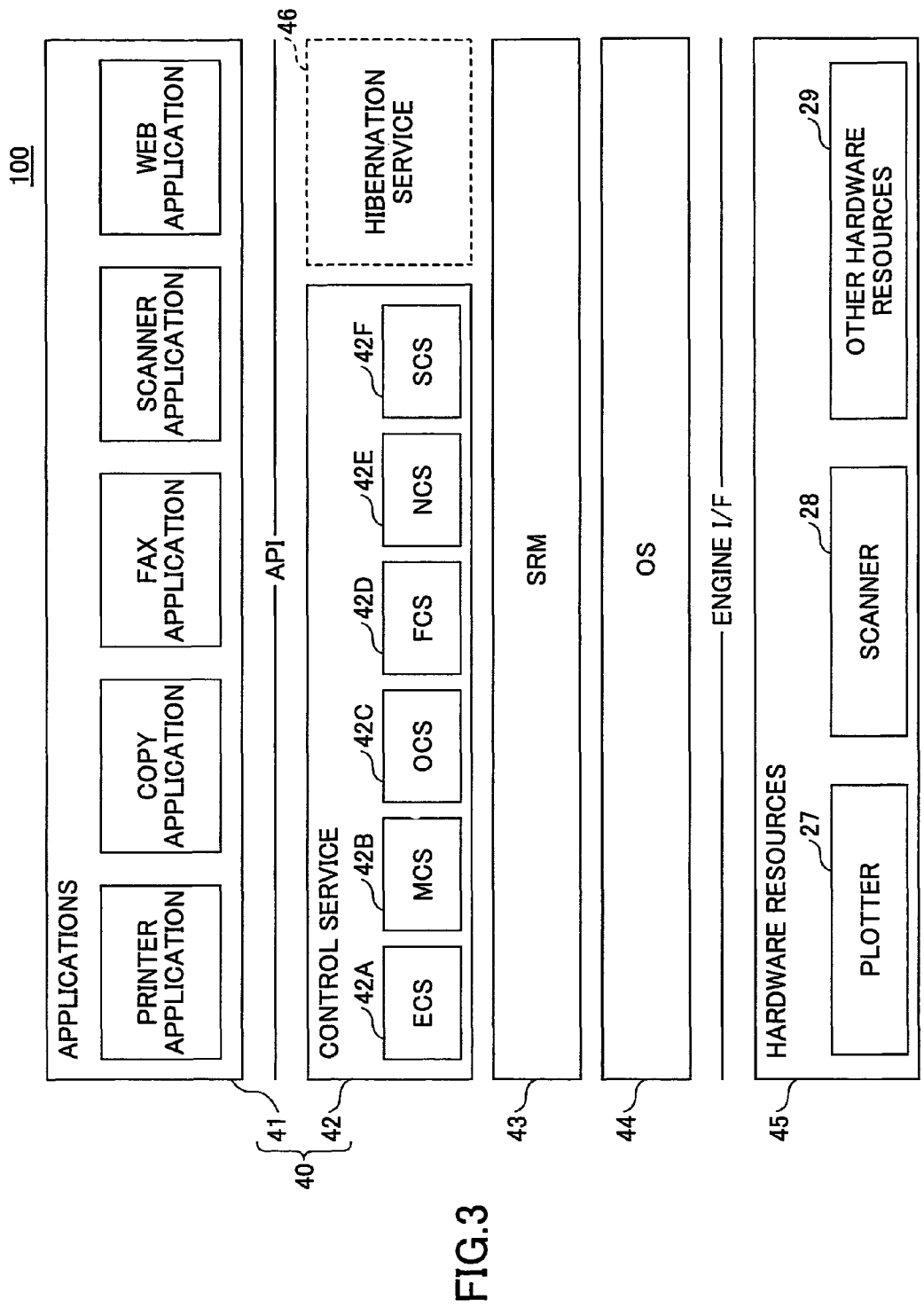
FIG. 3 is a functional block diagram of the digital MFP.

FIG. 3 is a functional block diagram of the digital MFP 100. The digital MFP 100 includes at least one of applications 41, an API (Application Interface), a control service 42, an SRM (system resource manager) 43, the OS 44, an engine I/F, and at least one of hardware resources 45. The applications 41 and the control service 42 may be collectively referred to as a component 40.

The control service 42 interprets a process request from the application 41 and generates a request to acquire the required hardware resource 45. The SRM 43 adjusts acquisition requests from the control service 42. The control service 42 includes plural service modules, such as an ECS (engine control service) 42A for controlling the hardware resource 45 such as the plotter 27 and the scanner 28; a MCS (memory control service) 42B for acquiring and releasing an image memory, using the HDD or flash memory 15A, and compressing/decompressing image data; an OCS (operation panel control service) 42C for controlling the operations panel 30, acquiring an operation of pressing the key of the operations panel 30 as a key event, and sending a key event function corresponding to the acquired key event to a SCS (system control service) 42F; a FCS (fax control service) 42D for performing facsimile transmission/reception through a public telephone line, recording and printing received facsimile data, and scanning an original document to be sent by fax transmission; a NCS (network control service) 42E for receiving, in accordance with protocols, data that has been sent via the network to the application 41 connected to the network, sending the received data to the application 41, and sending data from the application 41 via the network; and the SCS (system control service) 42F for managing the application 41, controlling the operations panel 30, displaying a system screen page, displaying an LED, managing resources, and controlling interrupt applications.

The OS 44 is a universal operating system such as UNIX (registered trademark) or LINUX (registered trademark), which operates service modules such as the application 41 and the control service 42 in parallel.

The application 41 requests the control service 42 to perform a process according to a predefined function (API). Examples of the application 41 are as follows. A printer application is for expanding print target data, which is described in a page-description language, into raster data. A copy application is for executing processes starting from scanning a document in a copy process to printing out a document. A fax application is for performing facsimile transmission. A scanner application is for performing a scanning process. A Web application is for managing network files.

A hibernation service 46 is integrated with any one of the following elements, i.e., one of the applications 41, one process of the control service 42, the OCS 42C, or the SCS 42F. In FIG. 3, the hibernation service 46 is illustrated in the same layer as the control service 42. The hibernation service 46 is implemented when the CPU 11 executes the hibernation management program 20.

<Controlling Hibernation>

Figure 4:
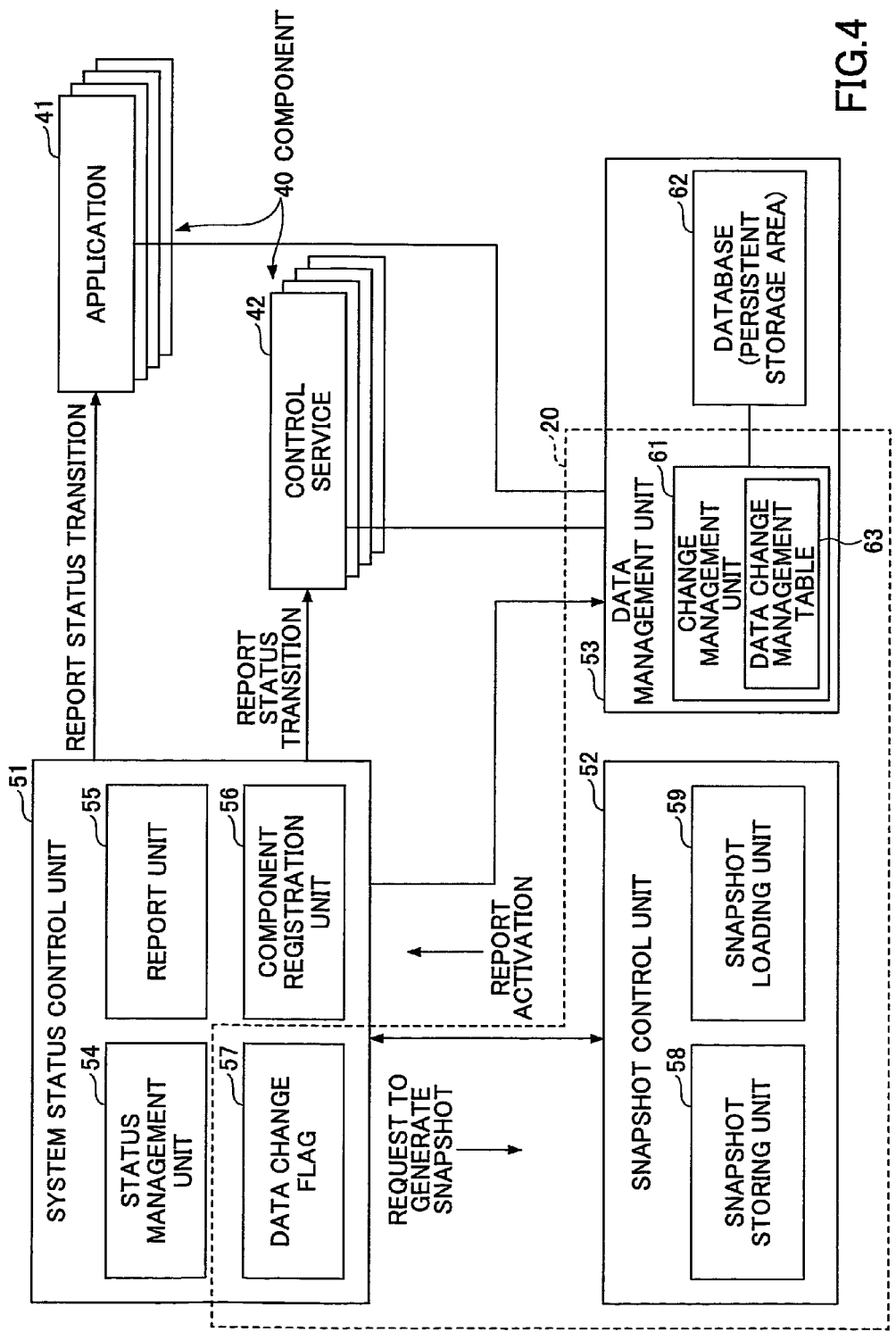
FIG. 4 is a functional block diagram of a hibernation management program for managing hibernation.

FIG. 4 is a functional block diagram of the hibernation management program 20 for managing hibernation. Among the functional blocks in FIG. 4, a snapshot control unit 52 is implemented when the CPU 11 executes the hibernation management program 20. Furthermore, extended functions (a data change flag 57 and a change management unit 61) for managing hibernation are added to a system status control unit 51 and a data management unit 53, respectively. The system status control unit 51 is for controlling the entire status of the digital MFP 100. The data management unit 53 is for managing permanent data in the system such as user information and setting information.

The arrangement of the block diagram of FIG. 4 is one example. In another example, the system status control unit 51 may be implemented as part of the SCS 42F, and the snapshot control unit 52 and the data management unit 53 may be implemented as part of the MCS 42B.

The system status control unit 51 includes a status management unit 54, a component registration unit 56, and a report unit 55. The status management unit 54 controls the transition of the status of the digital MFP 100. The status of the digital MFP 100 is defined by the status of power consumption by the digital MFP 100. The status management unit 54 uses a timer to switch the status of the digital MFP 100.

Figure 5:
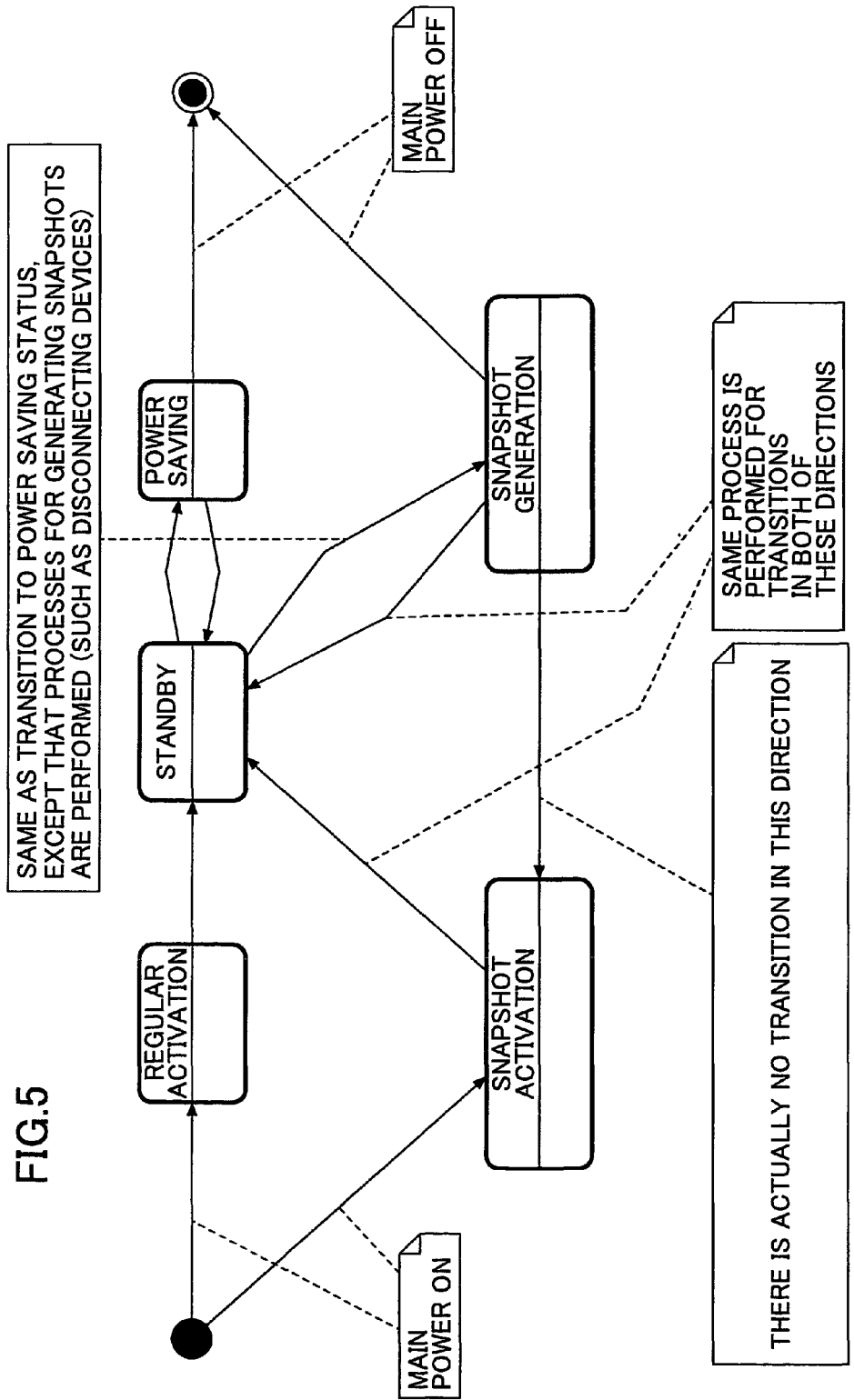
FIG. 5 illustrates an example of status transition of the digital MFP.

FIG. 5 illustrates an example of the status transition of the digital MFP 100. The digital MFP 100 switches among the five statuses of a "regular activation" status, a "standby" status, a "power saving" status, a "snapshot activation" status, and a "snapshot generation" status.

"Regular activation" refers to the status from when the power is turned on until activation of the system is completed. In the present embodiment, the default activation process is accompanied by loading the snapshot. Only in a case where a snapshot has not been generated, the regular activation process is performed. Meanwhile, "standby" is a status in which the digital MFP 100 is ready to execute a job.

When image formation is completed, the digital MFP 100 switches from a "regular activation" status to a "standby" status. Then, when a certain period of time has elapsed after switching to the "standby" status, or when a user presses the auxiliary power switch, the digital MFP 100 switches from the "standby" status to the "power saving" status. The auxiliary power switch is provided separately from the main power switch. The auxiliary power switch is used by the user for switching the digital MFP 100 from the "standby" status to the "power saving" status.

Furthermore, when an original is set in the ADF (Auto Document Feeder), or when the ADF is open/closed, or when print data is input via a network for forming an image, the digital MFP 100 switches from the "power saving" status to the "standby" status. The status management unit 54 monitors the status of the component 40, and when a transition condition is satisfied, the status management unit 54 switches the digital MFP 100 from one status to another. For example, the status management unit 54 increases or decreases the temperature of a fixing unit in the digital MFP 100, or increases or decreases the frequency of the clock signals supplied to the CPU 11.

Referring back to FIG. 4, the component registration unit 56 manages the components 40 that can be used, or registers a component 40 that has been newly installed in a registry or a setting file. The data management unit 53 can detect that a new component 40 has been registered by receiving a report from the component registration unit 56 or referring to the registry or the setting file. The component 40 may be installed in the HDD or flash memory 15A from another computer via the NIC 18. Alternatively, the component 40 may be stored in the memory card 24, distributed in the memory card 24, and installed in the HDD or flash memory 15A.

The report unit 55 sends a report of the transition status of the digital MFP 100 to the registered component 40. For example, when the digital MFP 100 switches from the "power saving" status to the "standby" status as the user presses a start key, the report unit 55 sends a report to the copy application reporting that the digital MFP 100 has switched to the "standby" status. Accordingly, the copy application executes a series of processes including scanning an original, performing an imaging process, performing an image forming process, and ejecting a sheet. When the report unit 55 sends a report to the component 40 reporting that the digital MFP 100 has switched to the "snapshot activation" status, the component 40 executes an initialization process and loads the changed data from the persistent storage area into the RAM 12.

The snapshot control unit 52 includes a snapshot storing unit 58 and a snapshot loading unit 59. The snapshot storing unit 58 generates a snapshot for storing a work environment based on information stored in the RAM 12, and stores the generated snapshot in the HDD or flash memory 15A. The snapshot may be compressed. As shown in FIG. 5, when the status management unit 54 switches the digital MFP 100 from a "standby" status to a "power saving" status, the snapshot storing unit 58 generates a snapshot based on a policy described below. Conditions for the snapshot storing unit 58 to generate snapshots are described below. Furthermore, when the main power source is turned on, the snapshot loading unit 59 reads a snapshot from the HDD or flash memory 15A and loads it in the RAM 12.

In FIG. 5, an arrow is pointed from the "snapshot generation" status to the "snapshot activation" status, but actually there is no transition in the direction indicated by this arrow. The transition indicated by this arrow corresponds to a change in the operations of the system status control unit 51, from when the main power source is turned off after generating a snapshot to when the main power source is turned on once again. This change appears to be a transition to the other components. Instead of having two statuses of the "snapshot generation" status and the "snapshot activation" status, these statuses may appear to be a single status to the other components, i.e., the activation may appear to be completed from the "snapshot generation" status.

Figure 6:
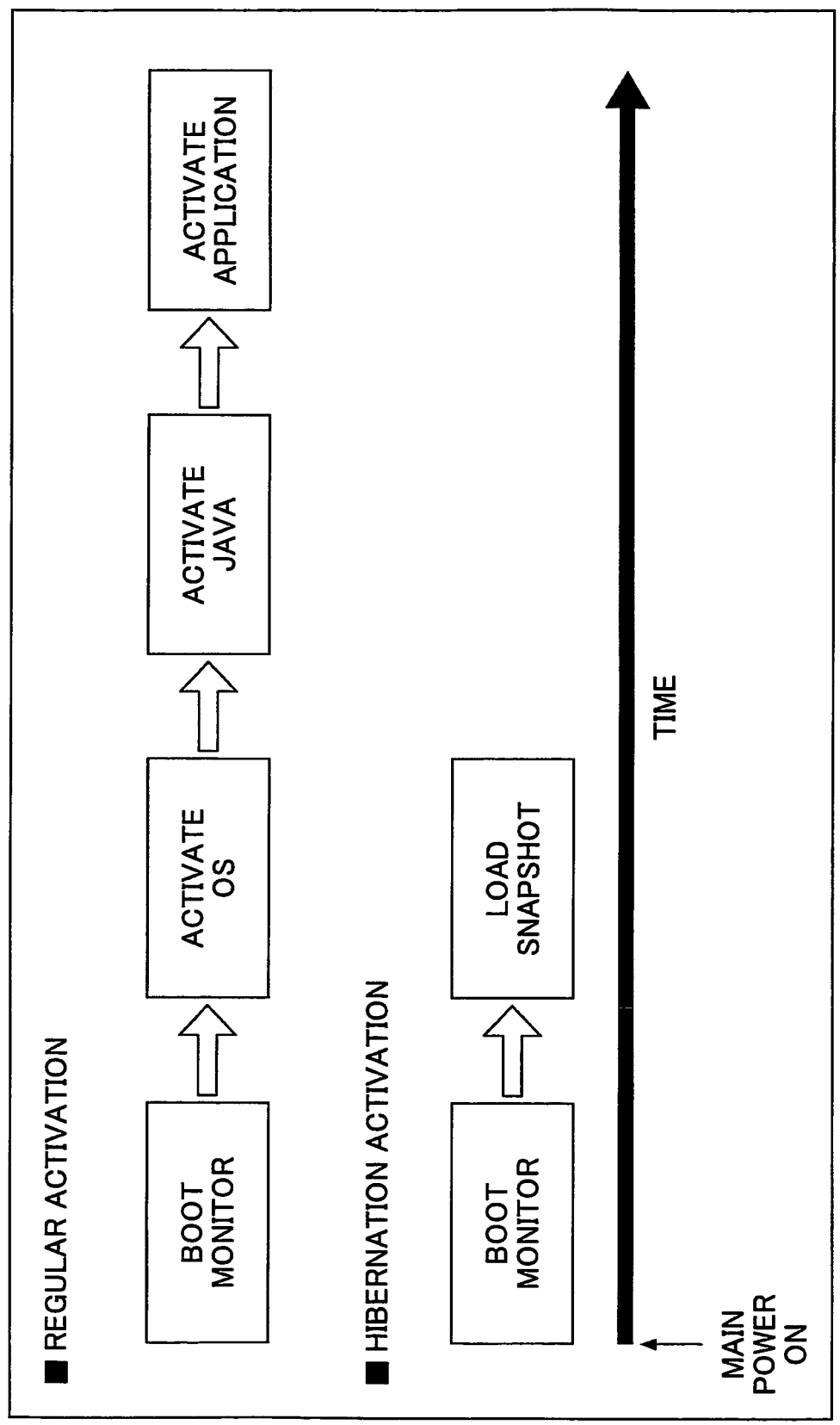
FIG. 6 schematically illustrates an example of activating the digital MFP by using snapshots.
Figure 7:
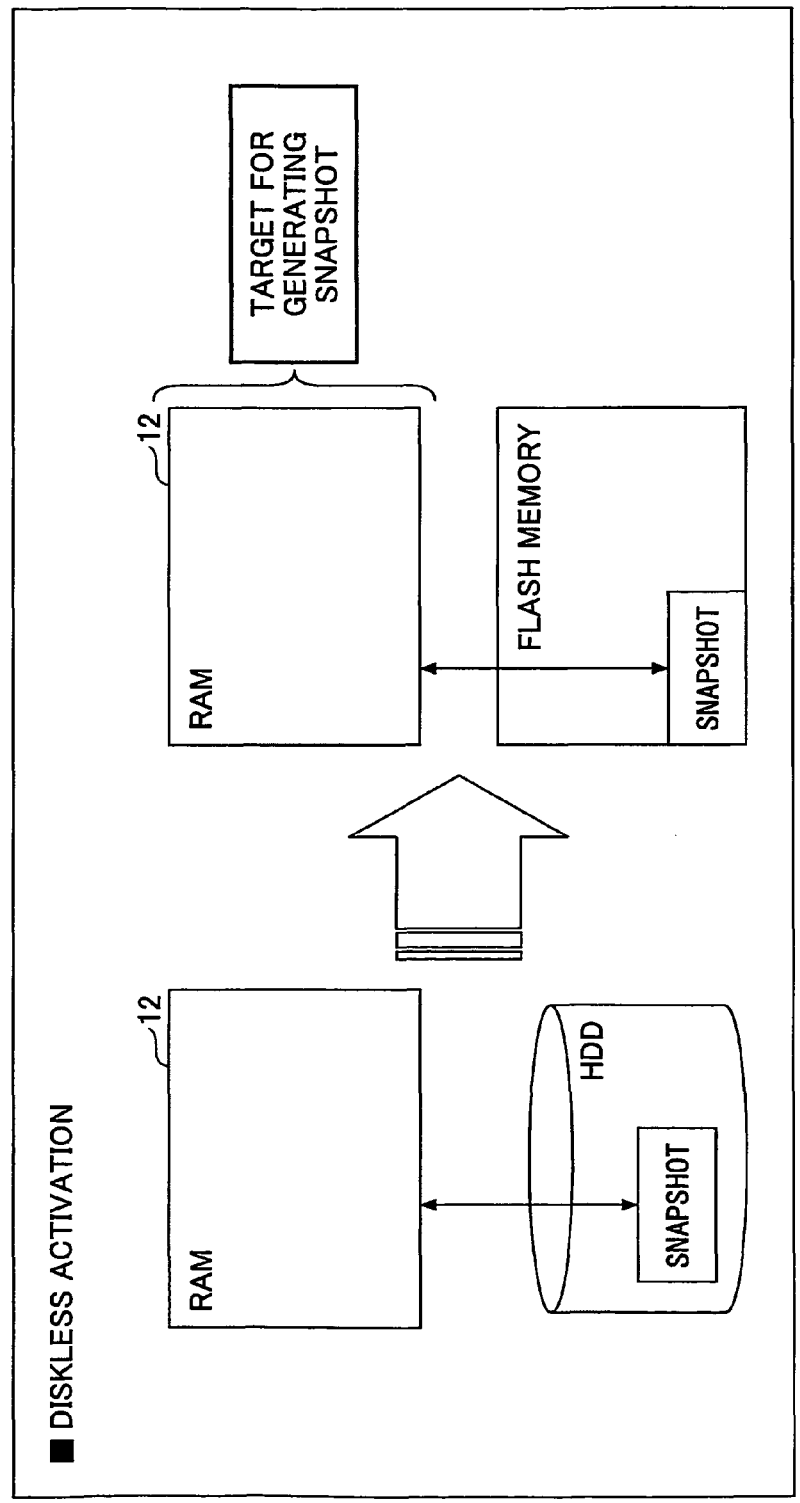
FIG. 7 illustrates an example of activating the digital MFP by performing hibernation.

FIG. 6 schematically illustrates an example of activating the digital MFP 100 by using snapshots. As a matter of comparison, an example of activating the digital MFP 100 without using snapshots (hereinafter, "regular activation") is also illustrated in FIG. 6. FIG. 7 illustrates an example of activating the digital MFP 100 by performing hibernation.

As shown in FIG. 6, in the case of "regular activation", when the main power source is turned on, the CPU 11 reads a Boot monitor from the ROM address indicated by the BIOS (Basic Input/Output System), and executes the Boot monitor. The Boot monitor reads the kernel of the OS 44 from the HDD or flash memory 15A, and loads the kernel in the RAM 12. When the CPU 11 executes the kernel, the OS 44 activates Java (registered trademark), which is previously set as a program that is to be automatically executed. Specifically, activation of Java (registered trademark) means to activate JavaVM. By activating JavaVM, the work environment of the application 41 described in Java (registered trademark) is established. Furthermore, the OS 44 activates various components 40, which are previously set to be automatically executed. The components 40 to be activated are registered in the registry and setting files by the component registration unit 56. When activating the components 40, each component 40 needs to be initialized, which takes time. Furthermore, as shown in FIG. 6, it takes time to activate the OS 44, Java (registered trademark), and the applications 41.

Meanwhile, in the case of "hibernation activation" using snapshots as illustrated in the bottom stage in FIG. 6, when the main power source is turned on, the CPU 11 reads a Boot monitor from the ROM address indicated by the BIOS, and executes the Boot monitor. The Boot monitor reads a snapshot from the HDD or flash memory 15A, and loads the snapshot in the RAM 12. Specifically, the snapshot is loaded in the RAM 12 after the initialization process is completed. Therefore, "hibernation activation" takes much less time from when the user turns the main power source on to when the digital MFP 100 is ready to be used.

Typically, the data in the RAM 12 is used to create a snapshot by hibernation. Thus, for simplifying the hibernation process as much as possible, the digital MFP 100 stores all data in the RAM 12 into the HDD or flash memory 15A. Furthermore, when loading the snapshot, the digital MFP 100 loads the snapshot stored in the HDD or flash memory 15A into the RAM 12. As shown on the right side of FIG. 7, it is possible to use only a flash memory as the "HDD or flash memory 15A", without the use of a HDD (diskless).

When a snapshot is stored by hibernation according to the present embodiment, the following points are different from the case where a PC (personal computer) stores a snapshot. Every time the operation of a PC is interrupted, the PC stores a snapshot of an image corresponding to the state of the PC immediately before the interruption. Thus, every time the PC is activated, a different snapshot is read. Conversely, in the digital MFP 100 according to the present embodiment, a snapshot is not necessarily created every time the power is turned off, and therefore the activation time can be reduced.

Figure 8:
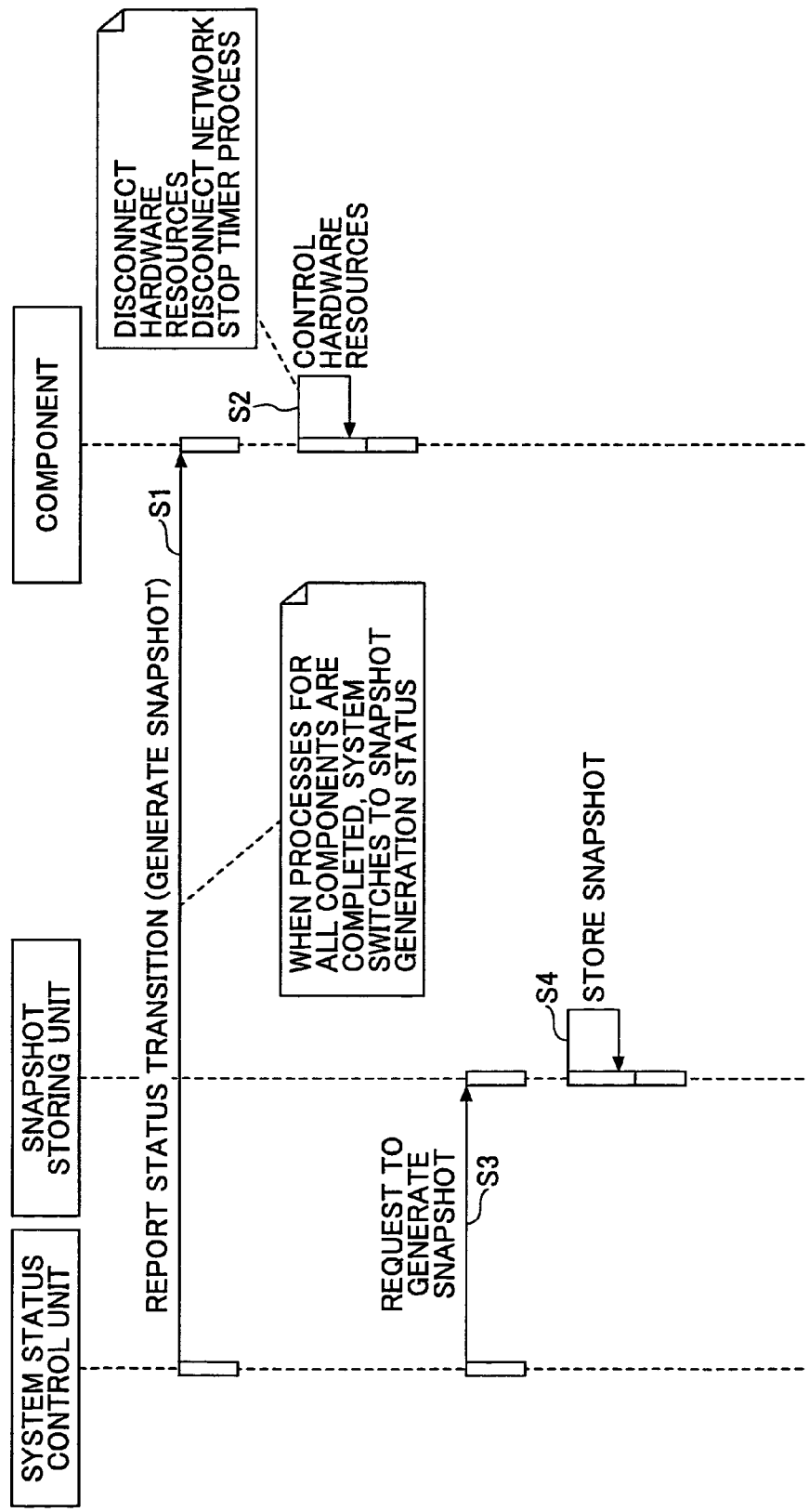
FIG. 8 is a sequence diagram of a process of storing a snapshot performed by a snapshot storing unit.

FIG. 8 is a sequence diagram of a process of storing a snapshot performed by the snapshot storing unit 58. When the system status control unit 51 switches the digital MFP 100 from a "standby" status to a "power saving" status, the report unit 55 sends a report notifying the component 40 of the transition of the status (status transition) (step S1).

The component 40 controls the hardware resource 45 for switching to the "power saving" status (step S2). Specifically, the component 40 cuts off connections with the plotter 27, the scanner 28, and the other hardware resources 29 (periodic communications may be made with the other hardware resources 29), turns off the NIC 18 to cut off the connection with a network (for example, stop the power supply to the NIC 18), and stops the timer process (i.e., the process of measuring time to perform time-slicing for multiple tasks).

As described above, the status transition is reported to the component 40, and the component 40 implements a process in response to the notification of the status transition. Accordingly, a new component can be easily added to the system. The additional component does not affect the operation of the overall system.

The system status control unit 51 stands by for a predetermined period of time (for example, several hundred milliseconds to several seconds) until all of the components 40 complete the operation of controlling the corresponding hardware, and then requests the snapshot storing unit 58 to generate a snapshot (step S3). In another example, the system status control unit 51 may wait for "hardware resource control completion reports" to be received from all of the components 40. If the system status control unit 51 stands by for only a predetermined period of time, the post process may not be completed within the predetermined period of time. Therefore, the method of waiting for reports may be more preferable.

The snapshot storing unit 58 that has acquired a request to generate a snapshot generates the snapshot and stores the snapshot in the HDD or flash memory 15A (step S4).

Figure 9:
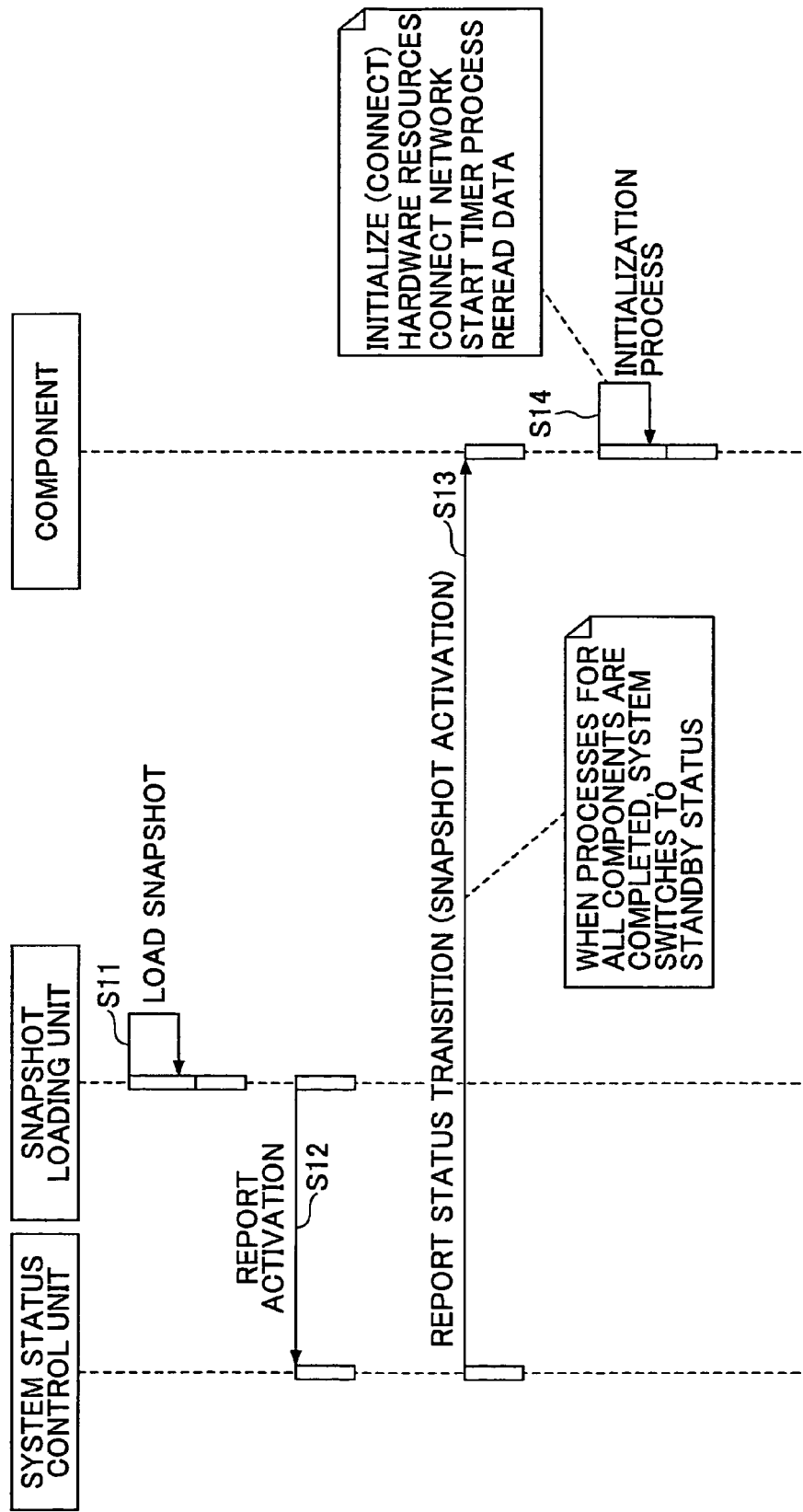
FIG. 9 is a sequence diagram of a process of loading a snapshot and activating the digital MFP performed by a snapshot loading unit.

FIG. 9 is a sequence diagram of a process of loading the snapshot and activating the digital MFP 100 performed by the snapshot loading unit 59. Step S14 in FIG. 9 includes one of the important features of the present embodiment.

As described with reference to FIG. 6, when the main power source is turned on, the snapshot loading unit 59 (corresponding to Boot monitor) reads the snapshot from the HDD or flash memory 15A, and loads the snapshot in the RAM 12 (step S11).

When the loading process is completed, the snapshot loading unit 59 sends a report of the activation to the system status control unit 51 (step S12). The system status control unit 51 sends a report of a transition to the "snapshot activation" status to the component 40 (step S13).

The component 40 controls the hardware resource for switching from the "snapshot activation" status to the "snapshot generation" status (step S14). Specifically, the component 40 initializes and resumes connections with the plotter 27, the scanner 28, and the other hardware resources 29, supplies power to the NIC 18 to resume the connection with the network, and resumes the timer process (i.e., the process of measuring time to perform time-slicing for multiple tasks). Furthermore, as the snapshot is loaded in the RAM 12, the component 40 reads data from the persistent storage area. The register of the CPU 11 also returns to the state before the power was turned off.

Referring back to FIG. 4, the data management unit 53 includes the change management unit 61 and a database 62. The change management unit 61 stores information regarding changes in the data, specifically a data change management table 63. The database 62 is provided in the HDD or flash memory 15A and the NVRAM 15B, and stores various data items. That is to say, the database 62 corresponds to the persistent storage area. Hereinafter, the database 62 is referred to as the database (persistent storage area) 62.

The data in the database (persistent storage area) 62 is used by the component 40, and there are various types of data. The data in the database (persistent storage area) 62 may be changed when the component 40 directly updates the data or when the data is overwritten by the data from the RAM 12. In the present embodiment, even if the data in the database (persistent storage area) 62 is frequently changed as a result of being overwritten by the data from the RAM 12, it is possible to prevent an inconsistency between the RAM 12 and the database (persistent storage area) 62.

The data used by the component 40 and the process of changing the data are described below. Examples of the data are indices of user information, parameters for controlling hardware, counter values, logs, etc.

<Conditions of Generating Snapshots>

Next, a description is given of the conditions of generating snapshots in the digital MFP 100 according to the present embodiment. The snapshot storing unit 58 determines whether a snapshot is to be generated according to the policies described below. When there is data that satisfies both the policy of generating a snapshot and the policy of not generating a snapshot, such data is classified, in advance, as the former type of data (generate snapshot) or latter type of data (do not generate snapshot).

A snapshot is generated when a large data size is used for updating the database (persistent storage area) 62 to change the data, or when the database (persistent storage area) 62 is not updated frequently to change the data.

A snapshot is not generated when a small data size is used for updating the database (persistent storage area) 62 to change the data, or when the database (persistent storage area) 62 is updated very frequently to change the data.

Example 1 Of Generating a Snapshot: Snapshots are generated when there is a change in the component 40 that loads indices of user information into the RAM 12. The component 40 used for data management often caches the user information in the RAM 12 for the purpose of increasing search speed. For example, the number of registered users may amount to around 10,000, in which case a significantly large amount of data is cached. Furthermore, user information is changed only when there is a change in the department or when new staff is added. Thus, the frequency of changing user information is low, e.g., a few times a month. When a user has been added or deleted, the user information needs to be changed. When the digital MFP 100 is activated, extensive processing time is required to reread user information. Accordingly, in this example, snapshots are generated.

Example 2 Of Generating a Snapshot: Snapshots are generated when there is a change in the component 40 that holds a large number of parameters used for controlling engines such as the plotter 27 and the scanner 28. When the digital MFP 100 switches to the "power saving" status, the power of the hardware resources is turned off. Therefore, when the digital MFP 100 returns to the "standby status" from the "power saving" status, the parameters need to be initialized. The number of parameters may exceed 100, and it is time-consuming to read all these parameters from the database (persistent storage area) 62 every time the digital MFP 100 is activated. Thus, the parameters are often cached in the RAM 12. Furthermore, these parameters are not frequently changed. Accordingly, in this example, snapshots are generated.

Example 1 Of Not Generating a Snapshot: The digital MFP 100 needs to count values with the use of plural counters, every time a sheet is printed out. Each counter has a small data size, and data of the counter is frequently updated. In this example, snapshots are not generated. Accordingly, the overall frequency of storing snapshots can be reduced, thus extending the operating life of the flash memory.

Example 2 Of Not Generating a Snapshot: For each job, a considerable amount of data is recorded in a log used for operations and in a log used for debugging. Logs are typically recorded in the persistent storage area. However, in this example, the logs are cached in the RAM 12 for the purpose of preventing the performance of the digital MFP 100 from degrading. In this example, instead of generating snapshots, whenever the digital MFP 100 switches to a "power saving" status (before storing a snapshot), the digital MFP 100 writes the log (data) cached in the RAM 12 into the persistent storage area. As the log of the RAM 12 is written into the persistent storage area, there would be no log in the RAM 12 when snapshot activation is performed. In this manner, it is possible to prevent the record of the log from being lost even without generating a snapshot.

The data change management table 63 for managing data used by the component 40 is registered in the change management unit 61. FIG. 10 illustrates an example of the data change management table 63 which is referred to by the change management unit 61. As shown in FIG. 10, the data change management table 63 includes a component ID of the component 40; data ID of data updated by the component 40 (an identifier for specifying the data to be reread by the component 40); the location of storing the data (specification of the nonvolatile memory such as HDD/NVRAM/flash memory, specification of the file format such as the database (persistent storage area) 62/XML file); and the data size. Thus, every time a file of a data ID is updated, the change management unit 61 can detect the change. The database (persistent storage area) 62 is used as the storage location.

When snapshot activation is performed, the component 40 determines whether it is necessary to reread data that is cached in the RAM 12 (data that is not cached in the RAM 12 does not need to be reread). Data is cached in the RAM 12 when the data is changed by the component 40 (or when a report of the data change is received from the database (persistent storage area) 62). When the component 40 changes the data and the data needs to be reread, the component 40 requests the change management unit 61 to register the changed data. Accordingly, the change management unit 61 generates the data change management table 63 shown in FIG. 10.

The change management unit 61 detects a report of the data change from the component 40, and sends the detected report to the system status control unit 51. The system status control unit 51 determines whether to generate and store a snapshot. The timing at which the component 40 changes the data and the timing at which a snapshot is generated are usually different, and therefore the system status control unit 51 uses the data change flag 57.

The system status control unit 51 includes an area for storing information indicating whether data has been changed (i.e., an area for storing the data change flag 57 and files for the data change flag 57). The area is provided in a nonvolatile secondary (auxiliary) storage device (NVRAM, HDD, flash memory, etc.). The initial value of the flag is off (specifically, when the flag is off, it means that data has not been changed; when the flag is on, it means that data has been changed). When the system status control unit 51 receives a report from the change management unit 61, the flag is turned on. The flag is not turned on unconditionally. The system status control unit 51 refers to the data change registered in the data change management table 63 shown in FIG. 10, and turns the data change flag 57 on when a certain condition is satisfied. The condition is defined according to a policy. For example, the condition may be that the total data size exceeds a threshold, or that the frequency of updating the data within a predetermined period of time is less than a threshold. A snapshot is generated whenever there is a change in the database (persistent storage area) 62. Accordingly, the frequency of rereading data from the database (persistent storage area) 62 after activating the digital MFP 100 can be reduced, thereby reducing the activation time.

When the digital MFP 100 switches to a "power saving" status, the system status control unit 51 refers to the data change flag 57 (or refers to the change management unit 61). When the data change flag 57 is on, the system status control unit 51 requests the snapshot control unit 52 to generate a snapshot. When the system status control unit 51 receives a request to generate a snapshot, or when the system status control unit 51 receives a report that a snapshot has been generated from the snapshot storing unit 58, the system status control unit 51 resets the data change flag 57 to be turned off.

<Another Example 1 of Condition of Generating Snapshot>

Figure 11:
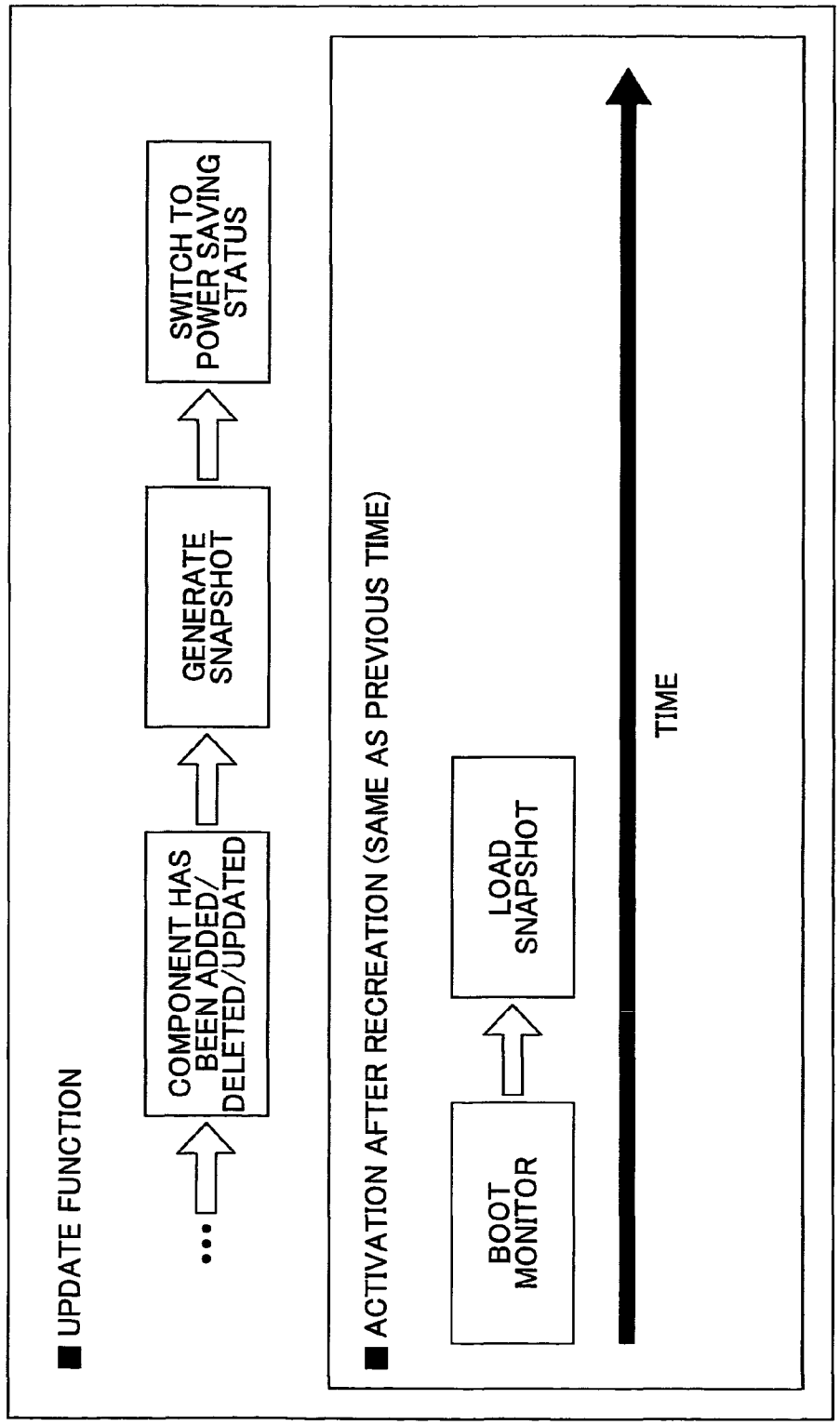
FIG. 11 schematically illustrates an example of generating a snapshot when a component has been added, deleted, or updated.

FIG. 11 schematically illustrates an example of generating a snapshot when the component 40 has been added, deleted, or updated. Changes are not only made in the data of the RAM 12. There are cases where the component 40 itself is installed or uninstalled. For example, when a particular component 40 has been uninstalled, but a memory image of the uninstalled component 40 is included in the snapshot, the following problem may arise. Specifically, the programs and data necessary for executing the corresponding application 41 (component 40) are deleted from the HDD or flash memory 15A as the component 40 has been uninstalled, but a snapshot (including the uninstalled component 40) is loaded in the RAM 12 when the digital MFP 100 is activated. Thus, the application 41 that is supposed to have been uninstalled will be activated. As a result, the user may be confused or an error may occur in the system.

In order to prevent such a problem, every time there is a change in the software configuration, the snapshot storing unit 58 generates and stores a snapshot. Specifically, the component registration unit 56 detects that the component 40 has been added/deleted/updated and records the change in a registry or a setting file. The component registration unit 56 requests the data management unit 53 to manage the change of adding/deleting/updating the component 40. An operation of upgrading the version of the component 40 is also considered as making a change in the component 40, similar to adding/deleting/updating the component 40. As described above, snapshots are generated, and therefore, even if the component 40 has been added, deleted, or updated, the activation time can be kept short by performing hibernation.

<Another Example 2 of Condition of enerating Snapshot>

Figure 12:
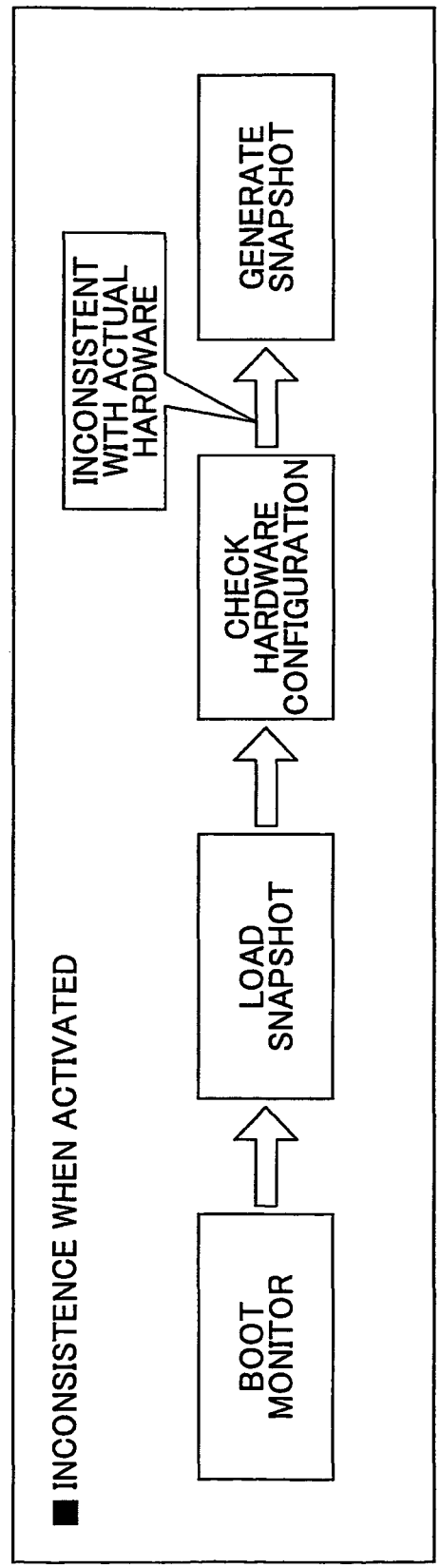
FIG. 12 schematically illustrates an example of generating a snapshot when hardware has been added, deleted, or updated.

In the above example, the component (software) 40 is changed. There are also cases where the hardware is changed, and snapshots are preferably generated when the hardware is changed. FIG. 12 schematically illustrates an example of generating a snapshot when hardware has been added, deleted, or updated. For example, while the power of the digital MFP 100 is turned off, a sheet feeding tray may be removed, or a finisher purchased by the user may be connected to the digital MFP 100.

The software of the digital MFP 100 may have information of the hardware configuration cached in the RAM 12. When new hardware is connected to the digital MFP 100, and a previously-created snapshot is loaded in the RAM 12 after the new hardware is connected, the contents of the RAM 12 and the actual hardware configuration will be inconsistent.

Some components 40 are displayed on a user interface. The snapshot may include contents of a component 40 displayed on the user interface before the hardware configuration is changed. Furthermore, information indicating the remaining amounts of supplies such as toner and sheets is cached in the RAM 12 by the component 40 or displayed as icons on the user interface.

In principle, such hardware information needs to be updated every time the digital MFP 100 is activated. The hardware configuration rarely changes. Therefore it may not be necessary to update the cache of the RAM 12 concerning all hardware components every time the digital MFP 100 is activated. Only when there is a particular change in the hardware configuration information, the snapshot storing unit 58 generates a snapshot.

The system status control unit 51 can detect that the hardware configuration has been updated. Therefore, as shown in FIG. 12, when the digital MFP 100 is activated, the system status control unit 51 checks whether there are any inconsistencies between the contents of the snapshot and the actual hardware configuration. If there are any inconsistencies, the system status control unit 51 requests the snapshot storing unit 58 to generate a snapshot, and then the snapshot storing unit 58 generates a snapshot. Accordingly, the activation time can be reduced.

Figure 13:
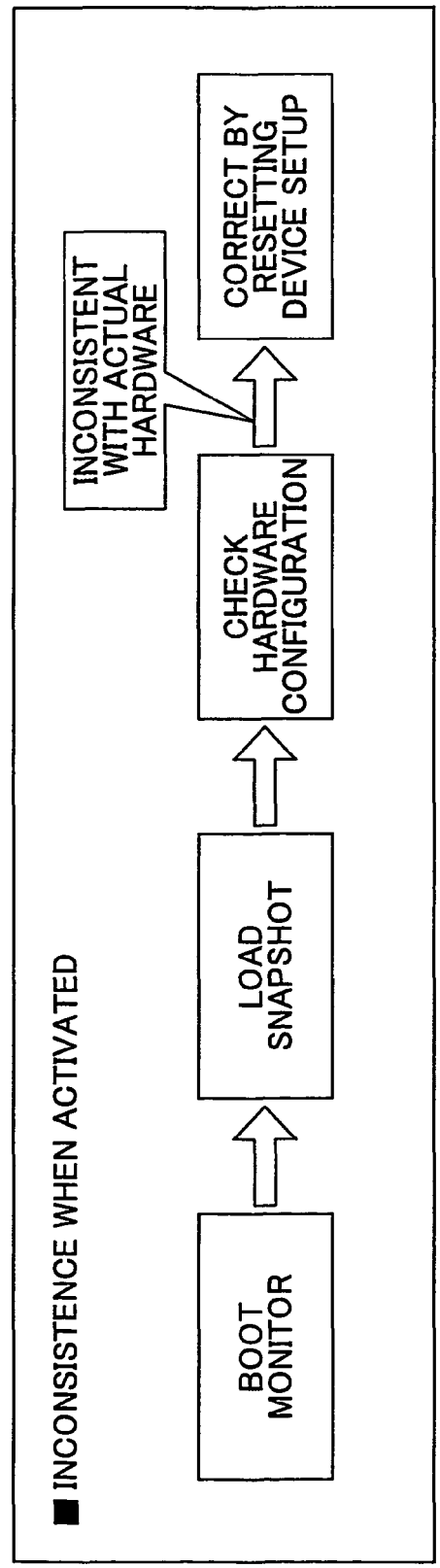
FIG. 13 schematically illustrates another example of generating a snapshot when the hardware has been added, deleted, or updated.

If there is only a slight change in the hardware configuration, it may not be necessary to generate a snapshot. FIG. 13 schematically illustrates another example of generating a snapshot when the hardware has been added, deleted, or updated. FIGS. 12 and 13 are the same from the step of loading a snapshot performed by the snapshot loading unit 59 to the step of checking the hardware configuration performed by the system status control unit 51. However, the difference is that in FIG. 13, when only a slight inconsistency is found as a result of the check, the snapshot storing unit 58 does not generate a snapshot. For example, when the sheet type in the sheet tray has been changed, such an inconsistency can be easily corrected by changing the settings of the device setup (by changing the sheet type loaded in the RAM 12). Therefore, in this example, there is no need to recreate a hibernation image (snapshot).

The remaining amount of a supply changes with the passage of time. Therefore, it would be necessary to frequently generate snapshots if the snapshots were to precisely show the remaining amounts of supplies. Thus, instead of generating a snapshot every time the remaining amount of a supply changes, the remaining amount of a supply is reread from hardware such as a sheet tray every time the digital MFP 100 is activated.

Similarly, as for the icon shown on the user interface, the same icon may be assigned to a particular range of the remaining amount (for example, the indication on a scale increases for every 25%). In this case, a snapshot may be generated every time the icon changes, instead of generating a snapshot every time the remaining amount of supply changes. That is to say, the snapshot storing unit 58 may generate a snapshot only when the change in the hardware configuration has caused a change in the data of the RAM 12.

When the icon changes, data in the RAM 12 changes, and therefore a change is recorded in the data of the data change management table 63. The timing when the icon changes can be detected as the system status control unit 51 receives a report from the change management unit 61.

Figure 14:
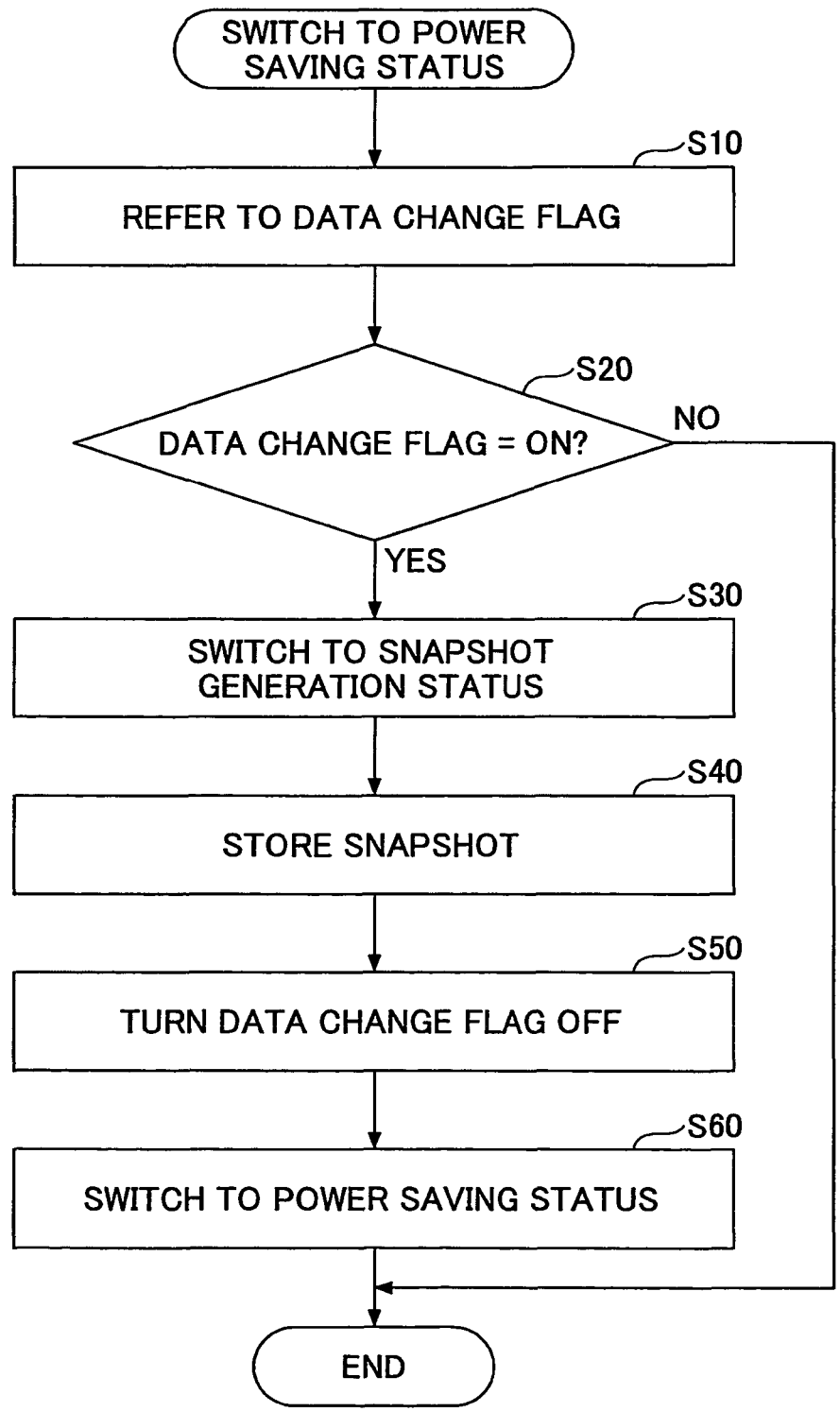
FIG. 14 is a flowchart of a process of generating and storing a snapshot performed by a snapshot control unit.

FIG. 14 is a flowchart of a process of generating and storing a snapshot performed by the snapshot control unit 52. The process of the flowchart in FIG. 14 starts as conditions are satisfied for the digital MFP 100 to switch to a "power saving" status. By making use of the time during which the digital MFP 100 is in the "power saving" status, it is possible to prevent the user from having to wait while interrupting the system execution to generate a snapshot. Furthermore, in cases where the data is continuously changed, it is possible to prevent the frequency of generating snapshots from increasing.

First, the system status control unit 51 (status management unit 54) refers to the data change flag 57 when the digital MFP 100 switches to the "power saving" status (step S10).

When the data change flag 57 is off (NO in step S20), it means that the change requires data having a small data size for updating the database (persistent storage area) 62, or the change incurs frequent updates of the data. Thus, the process of FIG. 14 ends.

When the data change flag 57 is on (YES in step S20), it means that the change requires data having a large data size for updating the database (persistent storage area) 62, or the change does not incur frequent updates of the data. Thus, the system status control unit 51 causes the digital MFP 100 to switch to a "snapshot generation" status (step S30).

The snapshot storing unit 58 receives a request to generate a snapshot from the system status control unit 51, generates a snapshot, and stores the generated snapshot in the HDD or flash memory 15A (step S40). When the system status control unit 51 receives a report that a snapshot has been generated from the snapshot storing unit 58, the system status control unit 51 resets the data change flag 57 to be turned off (step S50).

Then, the system status control unit 51 causes the digital MFP 100 to switch to the "power saving" status (step S60). According to the process of FIG. 14, the digital MFP 100 generates a snapshot only when the change requires data having a large data size for updating the database (persistent storage area) 62, or the change does not incur frequent updates of the data.

Figure 15:
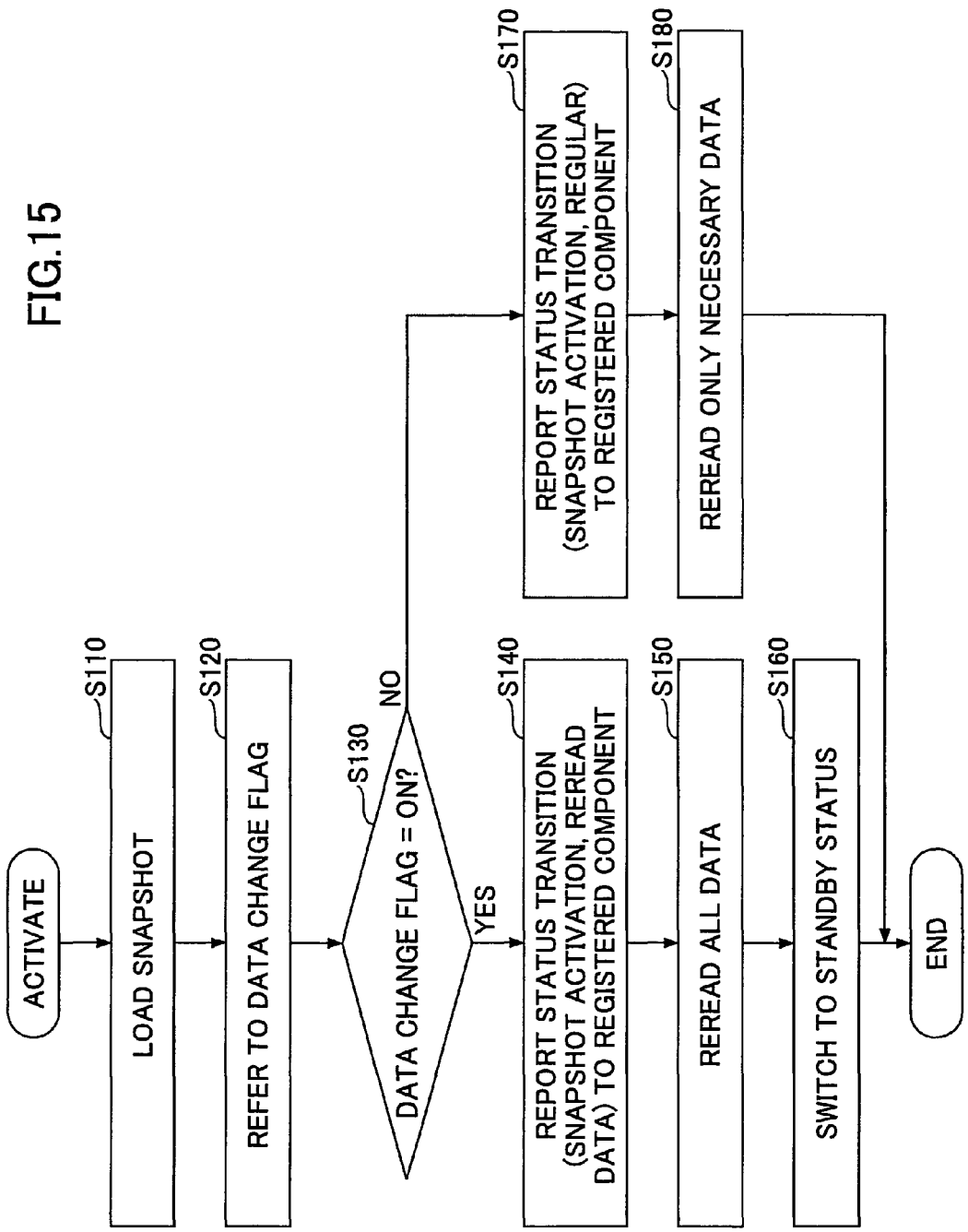
FIG. 15 is a flowchart of a process of loading the snapshot performed by a snapshot loading unit.

FIG. 15 is a flowchart of a process of loading the snapshot, which is performed by the snapshot loading unit 59. The flowchart in FIG. 15 starts when the main power switch is turned on.

When the main power source is turned on, the system status control unit 51 causes the digital MFP 100 to switch to the "snapshot activation" status (step S110). The system status control unit 51 (status management unit 54) refers to the data change flag 57 when the digital MFP 100 is activated (step S120).

The data change flag 57 is initially turned off, and is also turned off when a snapshot is generated. Thus, when the data change flag 57 is on (YES in step S130), it means that the snapshot storing unit 58 was supposed to generate a snapshot, but did not generate a snapshot when the main power source was turned off. The user may have hastily turned off the main power switch, or some kind of failure may have occurred. A previously-generated snapshot would be old, and any change in the data would not be applied to the old snapshot.

Thus, the system status control unit 51 sends, to the component 40, a report of the status transition and also an instruction to reread all of the data from the database (persistent storage area) (step S140). The notice and instruction are included in step S13 of FIG. 9. "All of the data" means not only the changed data but also all data used by the component 40.

Next, the component 40 rereads all of the data from the database (persistent storage area) 62 (step S150). Even if some kind of failure occurs, the digital MFP 100 can be activated at a higher speed compared to regular activation.

When conditions for switching to the "standby" status are satisfied, the system status control unit 51 causes the digital MFP 100 to switch to the "standby" status (step S160). The digital MFP 100 may automatically switch to a "power saving" status immediately after being activated, and generate a snapshot, so that a snapshot is definitely generated.

When the main power is turned off without generating a snapshot (i.e., when the data change flag 57 is on), the digital MFP 100 may be activated by regular activation rather than by snapshot activation. In particular, when there has been a change in the software configuration, it may not be possible to recover a proper state simply by rereading the database, and complex processes may be required. Thus, in another example, there may be a flag indicating that a snapshot has not been generated due to such circumstances, and regular activation may be performed when such a flag is effective.

Referring back to step S130, when the data change flag 57 is off (NO in step S130), it means that the snapshot storing unit 58 has generated a snapshot. In this case, by loading a snapshot in the RAM 12, the data to be updated can be written into the RAM 12. Therefore, the system status control unit 51 only has to report the status transition to the component 40 (step S170). This report is included in step S13 of FIG. 9.

A snapshot may have not been generated even if data in the database (persistent storage area) 62 had been updated. Therefore, the component 40 reloads such updated data from the database (persistent storage area) 62 into the RAM 12 (step S180). The data to be loaded has been changed, but a corresponding snapshot has not been generated. Therefore, the component 40 refers to the data change management table 63 in FIG. 10 and reloads the data corresponding to the registered data ID (i.e., data that has been changed without generating a snapshot).

By performing the above process, only the data that has been changed without generating a snapshot needs to be reloaded by the component 40 from the database (persistent storage area) 62 into the RAM 12. Thus, the digital MFP 100 can be activated within a short period of time, although it may take more time compared to hibernation performed by a typical PC. A snapshot is stored only when there is a data change according to a particular policy (i.e., a snapshot is not stored for every change). Therefore, this configuration is advantageous in that even when a flash memory is used, the operation of storing snapshots has less impact on the durability of the flash memory.

<Data Change Management Table 63>

Figure 16:
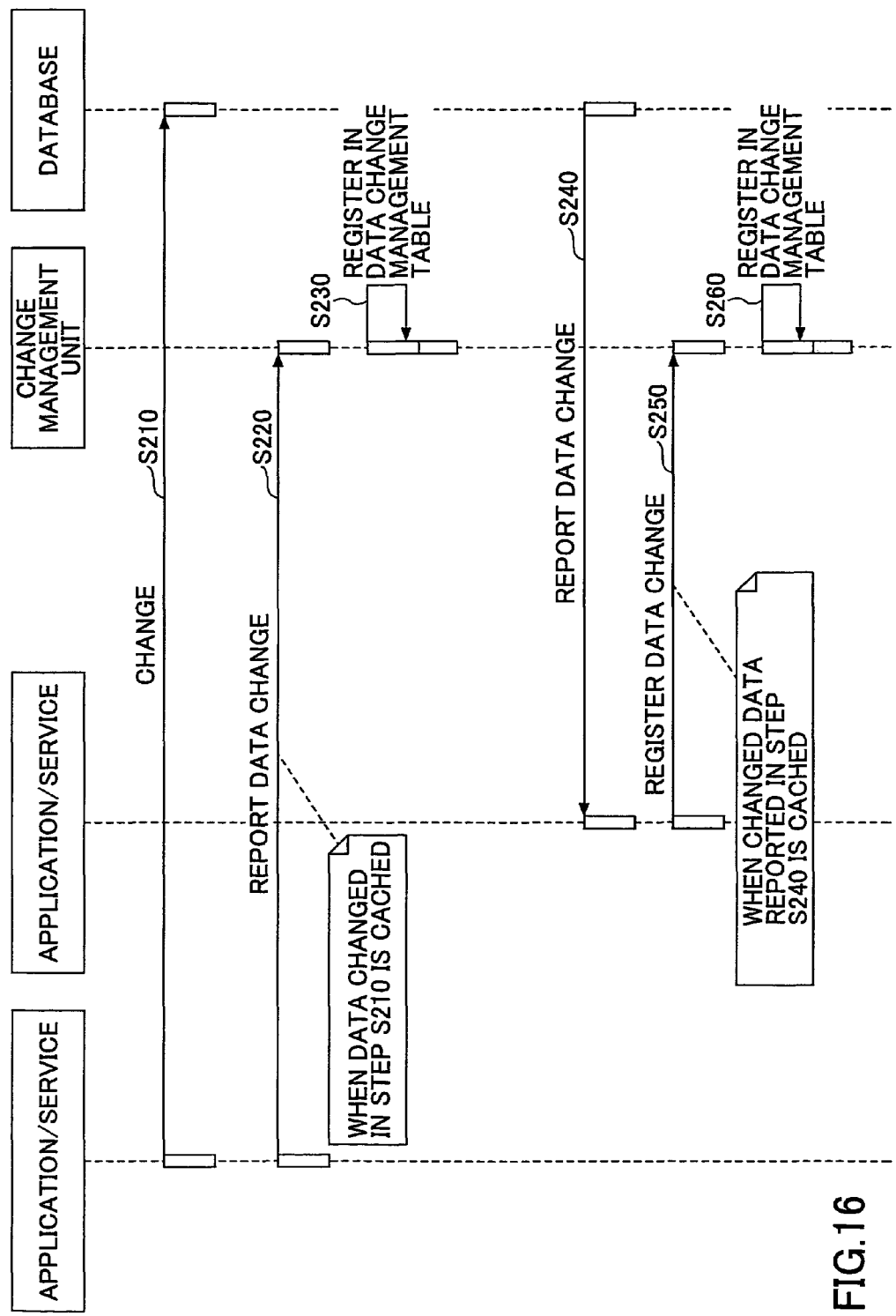
FIG. 16 is a sequence diagram of a process of registering data in a data change management table.

FIG. 16 is a sequence diagram of a process of registering data in the data change management table 63. The component 40 changes the data in the database (persistent storage area) 62 by executing a program (step S210). When the data is changed, the component 40 sends a report of the changed data to the change management unit 61 (step S220). Only the data that is cached in the RAM 12 is registered in the data change management table 63. When the component 40 can specify whether data is cached, the cached data is already known to the component 40. When the cached data is not already known, the component 40 refers to the OS 44. The information to be reported is shown in FIG. 10.

The change management unit 61 registers, in the data change management table 63, information relevant to the data change reported by the component 40 (step S230).

The database (persistent storage area) 62 sends a report of the data that has been changed to the components 40 other than the component 40 that changed the data (step S240). This report needs to be sent because the other components 40 may have also cached the same data as the changed data in the RAM 12.

Each component 40, which has received the report from the database (persistent storage area) 62, sends a report of the changed data to the change management unit 61 (step S250). Only the data that is cached in the RAM 12 is registered in the data change management table 63.

The change management unit 61 registers, in the data change management table 63, information relevant to the data change reported by the component 40 (step S260).

<Modification of Snapshot Generating Operation>

A process performed by the system status control unit 51 of determining whether to generate a snapshot by referring to the data change flag 57 is described above with reference to FIG. 14. The system status control unit 51 may also determine whether to generate a snapshot without referring to the data change flag 57.

Figure 17:
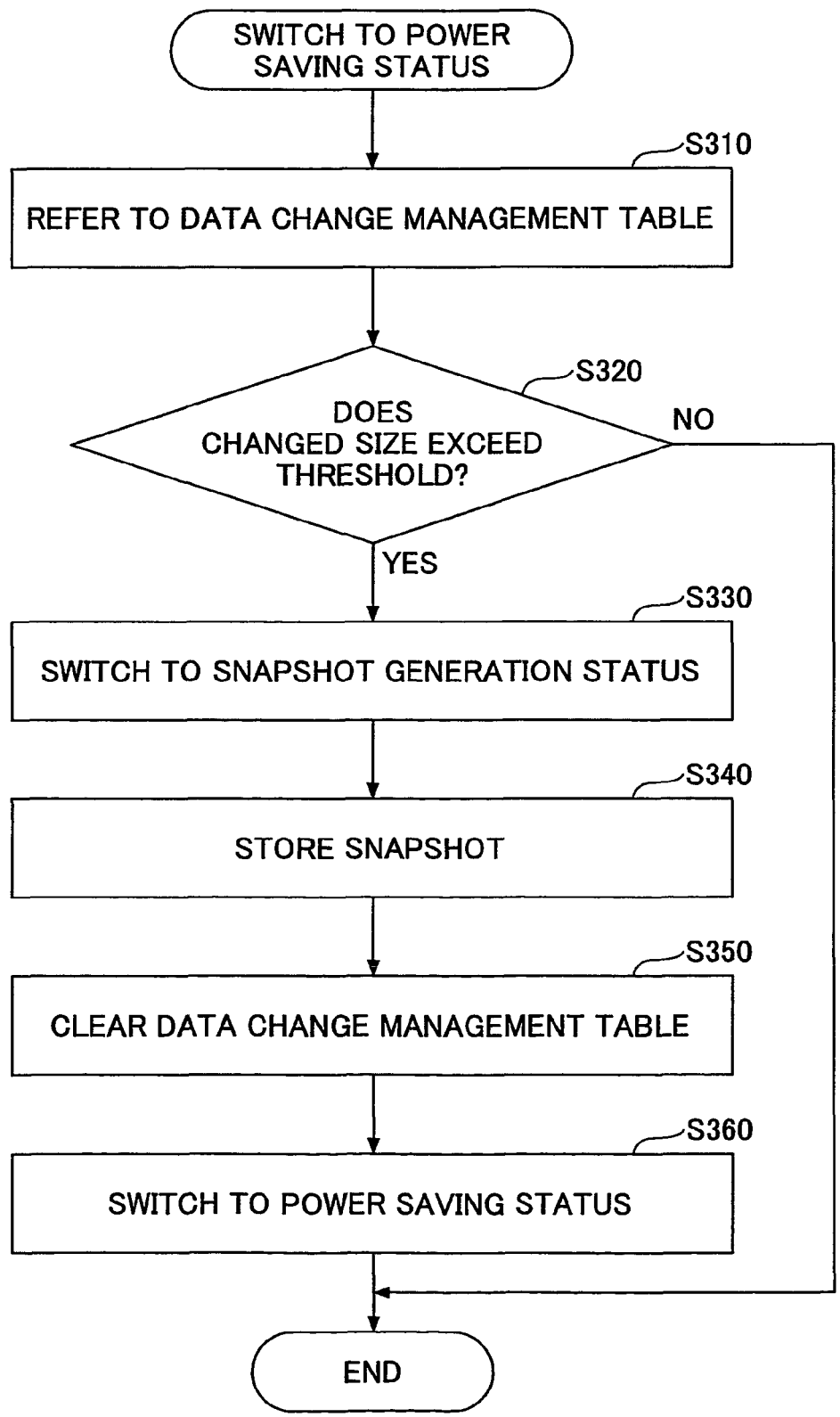
FIG. 17 is a flowchart of a process of determining whether to generate and store a snapshot performed by a system status control unit.

FIG. 17 is a flowchart of a process of determining whether to generate and store a snapshot performed by the system status control unit 51. The process of the flowchart in FIG. 17 starts as conditions are satisfied for the digital MFP 100 to switch to a "power saving" status.

First, when the digital MFP 100 switches to the "power saving" status, the system status control unit 51 (status management unit 54) refers to the data change management table 63 (step S310). Then, the system status control unit 51 reads the data sizes for the data IDs.

The system status control unit 51 compares the total data size with a threshold, and determines whether the total data size exceeds the threshold (step S320). The total data size corresponds to the size of the changed data, and therefore serves as a reference used for determining whether to generate a snapshot. By making use of the data size as a reference, the time required for loading data in the RAM 12 can be prevented from exceeding a predetermined time period, and therefore the activation time can also be prevented from exceeding a predetermined time period.

When the total data size is less than or equal to the threshold (NO in step S320), there is no need to generate a snapshot, and therefore the process of FIG. 17 ends.

When the total data size exceeds the threshold (YES in step S320), a snapshot needs to be generated, and therefore the system status control unit 51 causes the digital MFP 100 to switch to a "snapshot generation" status (step S330). The system status control unit 51 requests the snapshot control unit 52 to generate a snapshot.

The snapshot storing unit 58 generates a snapshot and stores it in the HDD or flash memory 15A (step S340). When a snapshot is generated, the data change management table 63 is no longer necessary. Therefore, once the snapshot is generated, the snapshot storing unit 58 requests the change management unit 61 to clear the data change management table 63 (step S350).

When a report that a snapshot has been generated is received from the snapshot storing unit 58, the system status control unit 51 causes the digital MFP 100 to switch to the "power saving" status (step S360).

By performing the above process, the snapshot storing unit 58 can generate a snapshot without using the data change flag 57.

In step S320, when the system status control unit 51 determines whether to generate a snapshot, instead of simply comparing the total data size with the threshold, the system status control unit 51 may multiply the data size by a weight (coefficient) corresponding to the storage location, and then obtain the sum of the data sizes. For example, the coefficient may be a value that is proportional to the time (reading time) required to read the data (including parsing the data format), and also proportional to the number of times the corresponding storage device can be overwritten. For example, if the reading time required for a particular data item is long, the activation time becomes long. By multiplying this particular data item by a large weight, the frequency of generating snapshots may be increased. Meanwhile, if the storage device storing a particular data item can only be overwritten a limited number of times (i.e., if the maximum number of times the storage device can be overwritten is small), the durability of the storage device will be largely affected when data is frequently overwritten in the storage device. In this case, the particular data item is to be multiplied by a small weight, so that the frequency of generating snapshots can be decreased.

Figure 18:
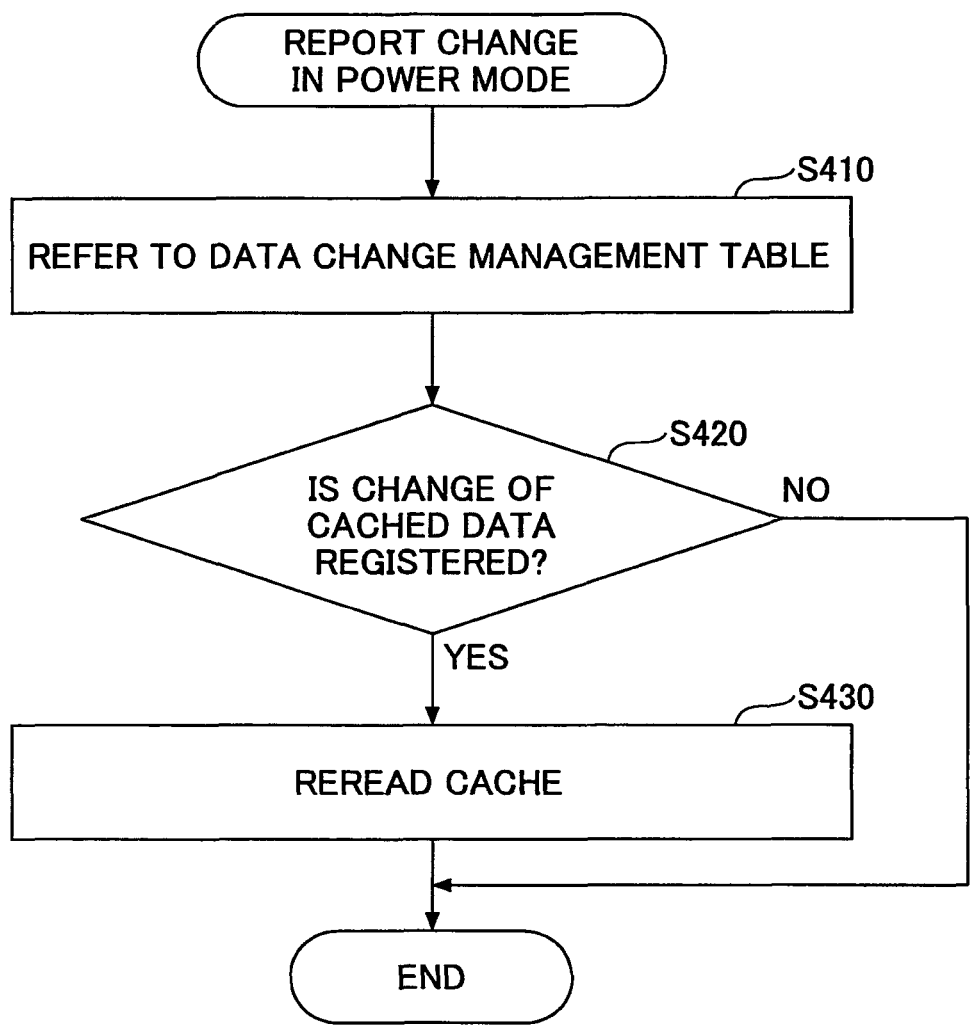
FIG. 18 is a flowchart of a process of activating the digital MFP without using a data change flag.

FIG. 18 is a flowchart of a process of activating the digital MFP 100 without using the data change flag 57.

The flowchart of FIG. 18 illustrates an example of a process performed by the digital MFP 100 of determining whether cached data is to be reread from the database (persistent storage area) 62. The process of the flowchart in FIG. 18 starts when the main power switch is turned on.

When the main power switch is turned on, the system status control unit 51 switches the digital MFP 100 into the "snapshot activation" status. As described above, the system status control unit 51 reports the status transition to the component 40.

Each component 40 that has received the report from the system status control unit 51 sends a query to the change management unit 61, in order to determine whether a change has been registered with respect to data cached in the RAM 12 by the corresponding component 40. In response to the query, the change management unit 61 refers to the data change management table 63, confirms whether there is such a registration in the data change management table 63, and returns the confirmed result to the component 40 (step S410).

Only when it is found that a change has been registered (YES in step S420), the corresponding component 40 rereads the data from the database (persistent storage area) 62. The data change management table 63 is cleared when a snapshot is generated (step S350 in FIG. 17), and therefore if the change management unit 61 can refer to the data change management table 63, it means that a snapshot has not been generated. Accordingly, when a data change is registered in the data change management table 63 (YES in step S420), it means that the change cannot be applied by loading a snapshot. Therefore, the component 40 rereads the changed data from the database (persistent storage area) 62 (step S430). When the data change management table 63 is clear (NO in step S420), it means that the change can be applied by loading the snapshot. Therefore, the component 40 does not need to reread changed data from the database (persistent storage area) 62.

In FIG. 18, the component 40 determines whether data has been changed by referring to the data change management table 63. In another example, the component 40 may determine whether data has been changed based on a comparison result obtained by the change management unit 61 by comparing the checksum of the data cached at the time of activation with the checksum of the database (persistent storage area) 62.

<Recording Format of Database (Persistent Storage Area) 62>

The above description does not mention the recording format of the database (persistent storage area) 62, but the activation time is affected by the recording format. Specifically, when data of the database (persistent storage area) 62 is managed by a general purpose database management system (DBMS), or described in a structured language such as an XML file, it takes a long time for the component 40 to read data from the database (persistent storage area) 62. This is because it takes time for parsing the query and the XML file of the database (persistent storage area) 62.

However, in order to reduce the activation time, it is necessary to reduce the time required for rereading data from the database (persistent storage area) 62. Therefore, when the data is changed, the data is preferably stored in the HDD or flash memory 15A in a format that can be efficiently read. For example, the contents of the RAM 12 may be stored in a binary format without modification (memory dumping). If the application 41 is described in the Java language, the data can be stored by object serialization (coding an object and a referred object in a byte stream).

<Generation of Image (Snapshot) from Contents Other than RAM 12>

A snapshot generated by hibernation generally includes the contents of the RAM 12 which is a volatile memory. However, the snapshot may be generated based on contents other than those of the RAM 12.

Figure 19:
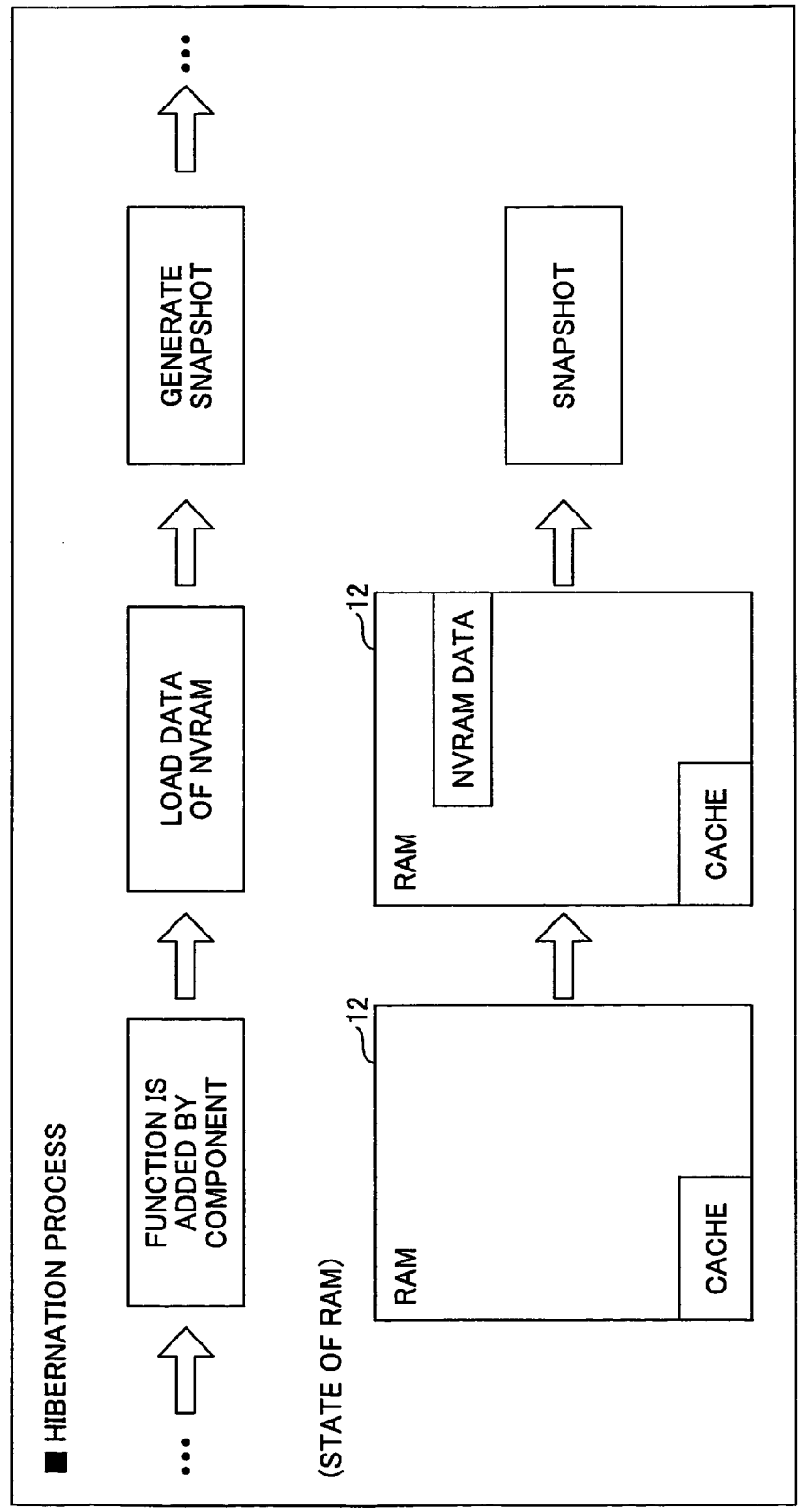
FIG. 19 illustrates an example of a snapshot including contents of a NVRAM.

FIG. 19 illustrates an example of a snapshot including contents of the NVRAM 15B. When conditions for generating a snapshot are satisfied (for example, the component 40 is added), the snapshot storing unit 58 copies the contents of the NVRAM 15B into the RAM 12. Then, the snapshot storing unit 58 generates a snapshot based on the RAM 12 including contents copied from the NVRAM 15B. Accordingly, the contents of the NVRAM 15B can be included in the snapshot.

Figure 20:
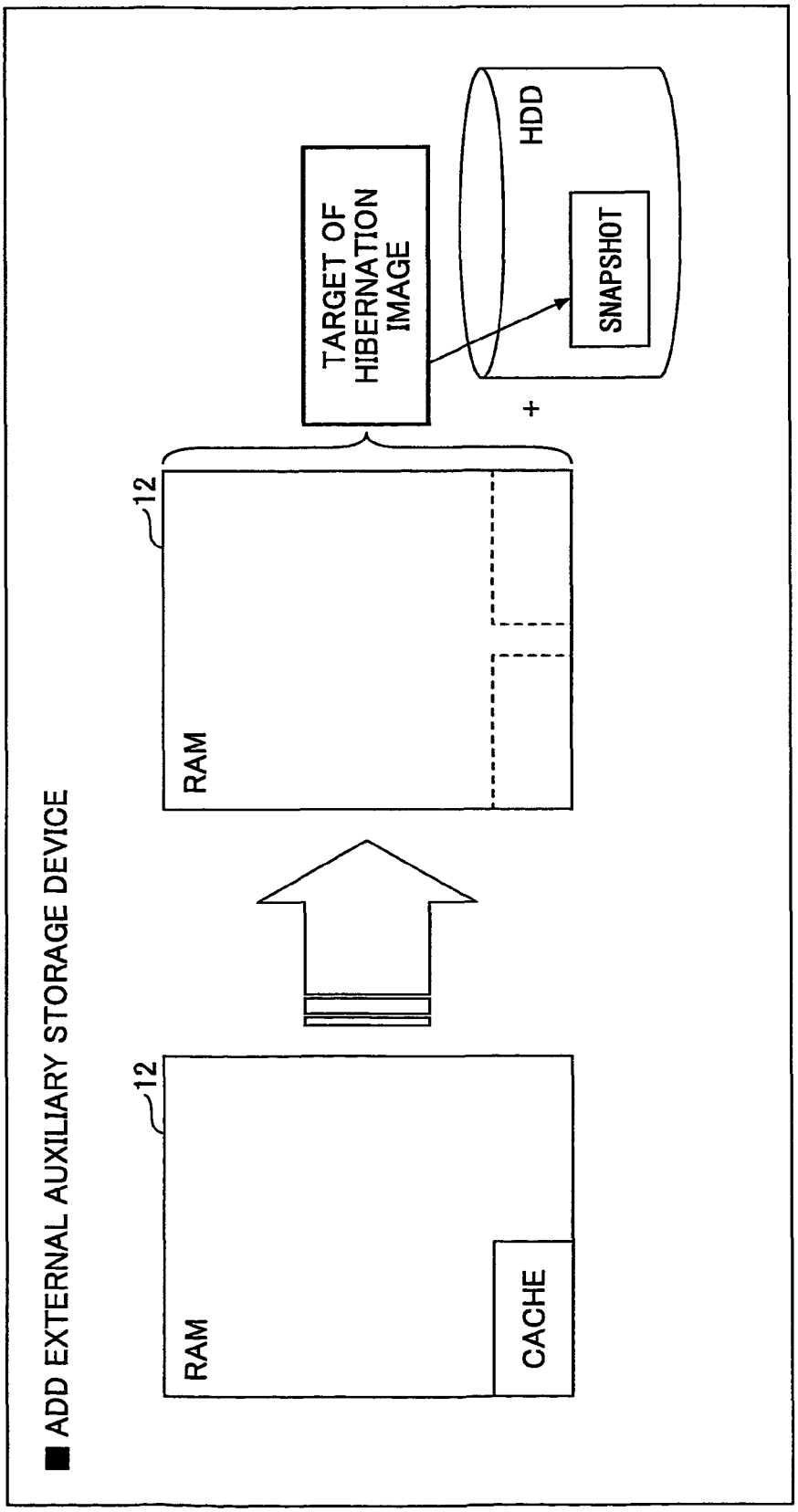
FIG. 20 illustrates an example of a snapshot including contents of a HDD or flash memory.

It is also possible to generate a snapshot including contents of the HDD or flash memory 15A. FIG. 20 illustrates an example of a snapshot including contents of the HDD or flash memory 15A. The RAM 12 may be initially used as the work memory for the component 40. When the capacity of the HDD or flash memory 15A is increased, the HDD or flash memory 15A may be used as the work memory instead of the RAM 12. Accordingly, the component 40 can execute programs upon moving the data from the RAM 12 to the HDD or flash memory 15A, or increasing the work memory in the HDD or flash memory 15A. In this case, the HDD or flash memory 15A includes data for the component 40. Therefore, the snapshot storing unit 58 generates a snapshot not only based on the RAM 12 but also based on part of the HDD or flash memory 15A. It is difficult to include all of the contents in the HDD or flash memory 15A in a snapshot. Therefore, the snapshot storing unit 58 detects, from the component 40, an address of a location in the HDD or flash memory 15A used by the particular component 40.

As described above, by limiting the frequency of generating snapshots, the durability of the flash memory can be enhanced, thereby extending the operating life of the flash memory. Furthermore, when the power of the digital MFP 100 is turned off without generating a snapshot, and the digital MFP 100 is activated once again, the component 40 reads only the changed data from the database (persistent storage area) 62. Accordingly, the activation time can be reduced. Furthermore, inconsistencies between the RAM 12 and the database (persistent storage area) 62 can be eliminated.

The present invention is not limited to the specific embodiments described herein, and variations and modifications may be made without departing from the scope of the present invention.

The present application is based on Japanese Priority Patent Application No. 2009-066456, filed on Mar. 18, 2009, the entire contents of which are hereby incorporated herein by reference.

What is claimed is:

1. An information processing apparatus comprising:
a main storage section that is volatile;
a first auxiliary storage section that is nonvolatile;
a second auxiliary storage section that is nonvolatile and configured to store second data;
a data processing unit configured to load the second data from the second auxiliary storage section into the main storage section;
a storing unit configured to store first data that is stored in the main storage section into the first auxiliary storage section at a predetermined timing, wherein the first data includes the second data that has been loaded into the main storage section from the second auxiliary storage section; and
a loading unit configured to load the first data stored in the first auxiliary storage section into the main storage section, wherein
the data processing unit is configured such that after the loading unit has loaded the first data into the main storage section from the first auxiliary storage section, the data processing unit loads, from the second auxiliary storage section into the main storage section, the second data that has changed after the storing unit has stored the first data into the first auxiliary storage section from the main storage section, and wherein
the data processing unit includes a change recording unit configured to record a change in hardware or software of the information processing apparatus, wherein the change in hardware or software of the information processing apparatus includes a change in the second data loaded into the main storage section, and
the storing unit is configured to stores the first data that is stored in the main storage section into the first auxiliary storage section when the change recording unit has recorded the change in the second data that has been loaded into the main storage section.

2. The information processing apparatus according to claim 1, wherein
when the change recording unit has recorded the change in the second data that has been loaded into the main storage section, but a frequency of changing the second data is greater than or equal to a predetermined value, the storing unit does not store the first data stored in the main storage section into the first auxiliary storage section.

3. The information processing apparatus according to claim 1, wherein
when power of the information processing apparatus is turned off without having the storing unit store the first data stored in the main storage section into the first auxiliary storage section immediately before the power is turned off, the data processing unit loads the second data into the main storage section from the second auxiliary storage section.

4. The information processing apparatus according to claim 1, wherein
the change recording unit records, in a data change management table, the change in the second data loaded into the main storage section, when the change in the second data has been made after the first data is stored into the first auxiliary storage section from the main storage section.

5. The information processing apparatus according to claim 4, wherein
the change recording unit records, in the data change management table, a data size of the second data that has changed in the main storage section, and
the storing unit stores the first data that is stored in the main storage section into the first auxiliary storage section when the data size exceeds a threshold.

6. The information processing apparatus according to claim 1, wherein
the change recording unit records that the data processing unit has been added, deleted, updated, or upgraded, and
the storing unit stores the first data that is stored in the main storage section into the first auxiliary storage section, when it is detected that the data processing unit has been added, deleted, updated, or upgraded.

7. The information processing apparatus according to claim 1, wherein
the change recording unit stores the second data that has changed in the main storage section into the second auxiliary storage section, by performing memory dumping.

8. A data recovery method comprising:
storing second data in a second auxiliary storage section that is nonvolatile;
loading, using a data processing unit, the second data from the second auxiliary storage section into a main storage section that is volatile;
storing, using a storing unit, first data that is stored in the main storage section into a first auxiliary storage section that is nonvolatile at a predetermined timing, wherein the first data includes the second data that has been loaded into the main storage section from the second auxiliary storage section;
loading, using a loading unit, the first data stored in the first auxiliary storage section into the main storage section
recording, using a change recording unit in the data processing unit, a change in hardware or software of the information processing apparatus, wherein the change in hardware or software of the information processing apparatus includes a change in the second data loaded into the main storage section; and after loading the first data into the main storage section from the first auxiliary storage section, loading, using the data processing unit, the second data, which has been changed after the first data is stored into the first auxiliary storage section from the main storage section, into the main storage section from the second auxiliary storage section, wherein the storing, using a storing unit, first data that is stored in the main storage section operation includes storing the first data that is stored in the main storage section into the first auxiliary storage section when the change recording unit has recorded the change in the second data that has been loaded into the main storage section.

9. A non-transitory computer-readable recording medium recording a program that causes an information processing apparatus to execute a method comprising:

storing second data in a second auxiliary storage section that is nonvolatile;

loading, using a data processing unit, the second data from the second auxiliary storage section into a main storage section that is volatile;

storing, using a storing unit, first data that is stored in the main storage section into a first auxiliary storage section that is nonvolatile at a predetermined timing, wherein the first data includes the second data that has been loaded into the main storage section from the second auxiliary storage section;

loading, using a loading unit, the first data stored in the first auxiliary storage section into the main storage section;

recording, using a change recording unit in the data processing unit, a change in hardware or software of the information processing apparatus, wherein the change in hardware or software of the information processing apparatus includes a change in the second data loaded into the main storage section; and after loading the first data into the main storage section from the first auxiliary storage section, loading, using the data processing unit, the second data, which has been changed after the first data is stored into the first auxiliary storage section from the main storage section, into the main storage section from the second auxiliary storage section, wherein, the storing, using a storing unit, first data that is stored in the main storage section operation includes storing the first data that is stored in the main storage section into the first auxiliary storage section when the change recording unit has recorded the change in the second data that has been loaded into the main storage section.

* * * * *